(12) United States Patent
Dluhos et al.

(10) Patent No.: US 9,811,779 B2
(45) Date of Patent: Nov. 7, 2017

(54) HOLOGRAPHIC COMPUTER SYSTEM

(76) Inventors: Eric John Dluhos, Belleville, NJ (US); Bradley Lloyd Wilk, Jersey City, NJ (US)

(*) Notice: Subject to any disclaimer, the term of this patent is extended or adjusted under 35 U.S.C. 154(b) by 1830 days.

(21) Appl. No.: 12/932,980

(22) Filed: Mar. 6, 2011

(65) Prior Publication Data

US 2011/0251982 A1 Oct. 13, 2011

Related U.S. Application Data

(60) Provisional application No. 61/339,519, filed on Mar. 6, 2010.

(51) Int. Cl.
*G06F 15/18* (2006.01)
*G06N 3/00* (2006.01)
(Continued)

(52) U.S. Cl.
CPC ............ *G06N 99/002* (2013.01); *B82Y 10/00* (2013.01); *G06E 3/00* (2013.01)

(58) Field of Classification Search
USPC .......................................................... 706/13
See application file for complete search history.

(56) References Cited

U.S. PATENT DOCUMENTS 7,127,109 B1 * 10/2006 Kim ..................... G03H 1/0005
356/512
7,133,203 B2 * 11/2006 Grier ..................... G02B 21/32
349/201
(Continued)

OTHER PUBLICATIONS

Circularly configured multi-SLM holographic display system Fahri Yaraş; ; Hoonjong Kang; Levent Onural 3DTV Conference: The True Vision—Capture, Transmission and Display of 3D Video (3DTV-CON), 2011 Year: 2011 pp. 1-4, DOI: 10.1109/3DTV.2011.5877213 IEEE Conference Publications.*

(Continued)

*Primary Examiner* — Michael B Holmes
(74) *Attorney, Agent, or Firm* — Quine Intellectual Property Law Group P.C.

(57) ABSTRACT

A method and apparatus used for general purpose problem solving using entanglement properties of holography. Intelligent point-based entities having spatial and other electromagnetic properties called DROPLETS [Data-Representative-Object-Particle(s)-Liking-EnTanglement] are generated as delegate objects—avatars—connected to data sources representing situations, event or other problems. A DROPLET's properties are controlled by changes in input data, self-state, feedback, and/or changes of other DROPLETS. Coherent rays are introduced and interact with DROPLETS, generating an INTELLIGENCE WAVEFRONT. Interference patterns are recorded and converted to binary machine codes of a near-infinite set, instructing where to store human/machine-readable content within a plurality of associative memories. Said content includes waveforms, harmonics, codes, data, and other holograms, which are dispersed and stored wholistically throughout using spread spectrum techniques. Upon future recognition of like-patterns of situations, events and other problems, the appropriate content components are retrieved and presented as full or partial solutions. Hardware, software, and hybrid embodiments are envisioned.

29 Claims, 16 Drawing Sheets

(51) Int. Cl.
*G06N 3/12* (2006.01)
*G06N 99/00* (2010.01)
*B82Y 10/00* (2011.01)
*G06E 3/00* (2006.01)

(56) References Cited

U.S. PATENT DOCUMENTS

| | | | | |
|---|---|---|---|---|
| 7,159,298 | B2* | 1/2007 | Lieberman | G06K 19/07718 216/100 |
| 7,179,512 | B2* | 2/2007 | Ebisu | G02F 1/13394 252/587 |
| 7,181,103 | B1* | 2/2007 | Greiner | G02B 6/124 385/14 |
| 7,190,859 | B2* | 3/2007 | Greiner | G02B 5/203 359/10 |
| 7,198,341 | B1* | 4/2007 | Rast | B41J 3/4071 345/179 |
| 7,227,688 | B2* | 6/2007 | Grier | G02B 21/32 349/201 |
| 7,286,732 | B2* | 10/2007 | Greiner | G02B 5/203 359/10 |
| 7,288,320 | B2* | 10/2007 | Steenblik | G06K 19/06009 205/118 |
| 7,295,200 | B2* | 11/2007 | Cameron | G03H 1/08 345/419 |
| 7,729,579 | B1* | 6/2010 | Greiner | G02B 6/124 385/14 |
| RE41,570 | E* | 8/2010 | Greiner | G02B 5/203 359/10 |
| 7,923,080 | B2* | 4/2011 | Ebisu | G02F 1/13394 349/155 |
| 8,085,578 | B2* | 12/2011 | Heyderman | G11C 11/14 365/129 |
| 8,422,799 | B1* | 4/2013 | Witzgall | G06T 9/001 348/416.1 |
| 9,442,459 | B2* | 9/2016 | Dluhos | G03H 1/0005 |
| 2003/0214623 | A1* | 11/2003 | Ebisu | G02F 1/13394 349/156 |
| 2007/0009677 | A1* | 1/2007 | Ebisu | G02F 1/13394 428/1.54 |
| 2011/0106690 | A1* | 5/2011 | Fisher | G06Q 10/00 705/38 |
| 2011/0251982 | A1* | 10/2011 | Dluhos | B82Y 10/00 706/13 |
| 2014/0160542 | A1* | 6/2014 | Dluhos | G03H 1/0005 359/3 |
| 2015/0015928 | A1* | 1/2015 | Dluhos | G03H 1/10 359/9 |
| 2015/0138085 | A1* | 5/2015 | Wilk | G06F 13/105 345/158 |
| 2016/0370761 | A1* | 12/2016 | Dluhos | G03H 1/0005 |

OTHER PUBLICATIONS

Automated Three-Dimensional Identification and Tracking of Micro/Nanobiological Organisms by Computational Holographic Microscopy Inkyu Moon; Mehdi Daneshpanah; Bahram Javidi; Adrian Stern Proceedings of the IEEE Year: 2009, vol. 97, Issue: 6 pp. 990-1010, DOI: 10.1109/JPROC.2009.2017563 IEEE Journals & Magazines.*

Robotic approach to multi-beam optical tweezers with Computer Generated Hologram Kazuhisa Onda; Fumihito Arai Robotics and Automation (ICRA), 2011 IEEE International Conference on Year: 2011 pp. 1825-1830, DOI: 10.1109/ICRA.2011.5980557 IEEE Conference Publications.*

Practical Color Matching Approach for Color Computer-Generated Holography Yile Shi; Hui Wang; Yong Li; Lihong Ma; Qiong Wu Journal of Display Technology Year: 2013, vol. 9, Issue: 8 pp. 638-643, DOI: 10.1109/JDT.2013.2258323 IEEE Journals & Magazines.*

Sparogram: The spatial augmented reality holographic display for 3D visualization and exhibition Minju Kim; Jungjin Lee; Kwangyun Whon 2014 IEEE VIS International Workshop on 3DVis (3DVis) Year: 2014 pp. 81-86, DOI: 10.1109/3DVis.2014.7160106 IEEE Conference Publications.*

Real-time color holographic video display system Fahri Yaras; Hoonjong Kang; Levent Onural 2009 3DTV Conference: The True Vision—Capture, Transmission and Display of 3D Video Year: 2009 pp. 1-4, DOI: 10.1109/3DTV.2009.5069660 IEEE Conference Publications.*

High speed water monitoring systems based on Digital Holographic Microscopy László Orzó; Balázs Wittner; Szabolcs Tőkés Ninth International Conference on Computer Science and Information Technologies Revised Selected Papers Year: 2013 pp. 1-9, DOI: 10.1109/CSITechnol.2013.6710366 IEEE Conference Publications.*

Holographic Capture and Display Systems in Circular Configurations Tomasz Kozacki; Małgorzata Kujawinska; Grzegorz Finke; Weronika Zaperty; Bryan Hennelly Journal of Display Technology Year: 2012, vol. 8, Issue: 4 pp. 225-232, DOI: 10.1109/JDT.2011.2167955 IEEE Journals & Magazines.*

A Review of Dynamic Holographic Three-Dimensional Display: Algorithms, Devices, and Systems Yijie Pan; Juan Liu; Xin Li; Yongtian Wang IEEE Transactions on Industrial Informatics Year: 2016, vol. 12, Issue: 4 pp. 1599-1610, DOI: 10.1109/TII.2015.2496304 IEEE Journals & Magazines.*

A high precision holographic phaseless near-field method Li Zhiping; Wang Zhengpeng; Wu Jianhua 2013 7th European Conference on Antennas and Propagation (EuCAP) Year: 2013 pp. 3594-3598 IEEE Conference Publications.*

Advances in interactive, holographic 3D displays C. Slinger; C. Cameron; S. Coomber; R. Miller; D. Payne; A. Smith; M. Smith; M. Stanley The 15th Annual Meeting of the IEEE Lasers and Electro-Optics Society Year: 2002, vol. 1 pp. 29-30 vol. 1, DOI: 10.1109/LEOS.2002.1133902 IEEE Conference Publications.*

Ultrasonic holography of 3D objects Sergey A. Tsysar; Oleg A. Sapozhnikov 2009 IEEE International Ultrasonics Symposium Year: 2009 pp. 737-740, DOI: 10.1109/ULTSYM.2009.5441458 IEEE Conference Publications.*

* cited by examiner

HOLOGRAPHIC COMPUTER SYSTEM

CROSS-REFERENCES TO RELATED APPLICATIONS

This application claims priority from U.S. Provisional Application 61/339,519 filed Mar. 6, 2010 and is fully incorporated herewith in its entirety for all purposes.

STATEMENT REGARDING FEDERALLY SPONSORED RESEARCH

Not Applicable

PRIOR ART REFERENCES

U.S. Patents

U.S. Pat. No. 7,512,573 Martinez Mar. 31, 2009 Optical processor for an artificial neural network U.S. Pat. No. 7,072,874 Decker Jul. 4, 2006 Optimization of training sets for neural-net processing of characteristic patterns from vibrating solids U.S. Pat. No. 6,819,469 Koba Nov. 16, 2004 High-resolution spatial light modulator for 3-dimensional holographic display U.S. Pat. No. 6,535,638 McGrew Mar. 18, 2003 Method and apparatus for reading and verifying holograms U.S. Pat. No. 6,356,854 Schubert Mar. 12, 2002 Holographic object position and type sensing system and method U.S. Pat. No. 6,216,267 Mitchell Apr. 10, 2001 Media capture and compression communication system using holographic optical classification, voice recognition and neural network decision processing U.S. Pat. No. 5,121,228 Paek Jun. 9, 1992 Holographic learning machine U.S. Pat. No. 4,892,370 Lee Jan. 9, 1990 Means and method for implementing a two-dimensional truth-table look-up holographic processor U.S. Pat. No. 4,837,843 Owechko Jun. 6, 1989 Hybrid optical and electronic associative memory

OTHER REFERENCES

1) Einstein, A., Podolsky, B., Rosen, N. Can quantum mechanical description of physical reality be considered complete? Physical Rev. May 15, 1935, 47(10) pp 777-780
2) Stanislayski, Konstantin. (1936). An Actor Prepares. London: Methuen; Creating a Role. (1961) Trans. Elizabeth Reynolds Hapgood. London: Mentor
3) Strasberg, Lee. (1988). A Dream of Passion. Plume
4) Bohm, D. (1980). Wholeness and the Implicate Order. Londer Routledge
5) Heisenberg's uncertainty paper translated into English by Wheeler, J. A. and Zurek H., in Quantum Theory and Measurement, Wheeler and Zurek, eds. (Princeton Univ. Press, 1983), pp. 62-8
6) Talbot, M. The Holographic Universe (1992). Harper Perennial
7) Leith, E. N. and Upatnieks, J. New techniques in wavefront construction. J. Opt. Soc. Am. 1961, 51, pp. 1469-1473
8) Leith, E. N. and Upatnieks, J. Reconstructed wavefronts and communication theory. J. Opt. Soc. Am. 1962, 6, 52, pp. 1123-1130
9) Gabor, D. Microscopy by reconstructed waveforms. Proc. R. Soc. 1949, A 197, pp. 454-487
10) Gabor, D. Light and Information. Progress in Optics; Elsevier: Amsterdam 1950; 1, pp. 109-153.
11) Denisyuk, Y. N. Photographic reconstruction of the optical properties of an object in its own scattered radiation field. Dokl. Akad. Nauk. SSSR, 1962, 144, pp. 1275-1279
12) Bragg, W. L. A new type of X-ray microscope. Nature 1939, 161, p. 678
13) Rogers, G. L. Artificial Holograms and Astigmatism. Proc. R. Edin. 1952, A63, pp. 313-325.
14) Lohmann, A. W. Paris, D. P. Binary Fraunhofer holograms generated by computer. Appl. Opt. October 1967, 6(10) pp. 1739-1748
15) Lesem, L. B., Hirsch. Computer Synthesis of Holograms for 3-D display. Comm. of the ACM. October 1968, 11(10) pp. 661-674
16) Ostrovsky, Y. I. Butosov M. M, Ostrovskajam G. V. 1980 Interferometry by holography. Springer, New York
17) G. L. Rogers (1950). "Gabor diffraction microscopy: the hologram as a generalized zone-plate". Nature 166 (4214): 237.
18) U. Schnars, W. Jüptner (2005). Digital Holography. Springer.
19) Kent, E. (1981). The Brains of Men and Machines. Mcgraw Hill
20) Pribram, K. H. (1977). Languages of the Brain. Brooks/Cole Publishing Co
21) Rosenblatt, Frank (1958), The Perceptron: A Probabilistic Model for Information Storage and Organization in the Brain, Cornell Aeronautical Laboratory, Psychological Review, 65 (6), pp. 386-408
22) McCulloch, W. and Pitts, W. (1943). A logical calculus of the ideas immanent in nervous activity. Bulletin of Mathematical Biophysics, 7:115-133.
23) F. Rosenblatt. Principles of Neurodynamics. Spartan Books, 1962
24) Boole, George (1854). An investigation of the Laws of Thought on Which are Founded the Mathematical Theories of Logic and Probabilities. Macmillan. Reprinted with corrections, Dover Publications, New York, N.Y., 1958
25) Aiken, Howard H. and Grace M. Hopper, "The Automatic Sequence Controlled Calculator", Electrical Engineering, Vol. 65 No. 8-9, pp. 384-391(August 1946); No. 10, pp. 449-454 (October 1946); No. 11, pp. 522-528 (November 1946)
26) Austrian, G. D. (1982). Herman Hollerith: The Forgotten Giant of Information Processing. Columbia
27) Burks, A. W, Burks, A. R, The ENIAC: The first general-purpose electronic computer in annals of the History of Computing, 3(4), 1981, pp 310-389)

BACKGROUND OF THE INVENTION

Quantum Entanglement

Whereas conventional digital computers and conventional quantum computers rely on computation by means of Boolean mechanics, the computing power of the HCS works primarily using a concept of 'entanglement' entanglement of data points arising from a situation, event or other problem.

It is a known controversy in quantum physics, that all particles in the universe may be entangled, that is, they are connected to each other in some way. If that is true, then, arguably, all matter and energy particles have some meaning in terms of a relationship with any other particle. Such relationships are bound to form patterns. These patterns may be more or less undeveloped and harder to recognize whereas they may be more or less developed and therefore easier to recognize. Latent or manifest, however, these patterns are more than likely to repeat themselves, from time to time.

Likewise, it has been known for quite some time that small electromagnetic particles such as photons and electrons have a dualistic nature about them. That is to say that the particles behave as though they are in fact particles—small rocks for lack of a better terminology—but also that they are undulating waves of pure energy. These small particles are generally known to take up multiple positions in space, i.e, there is an UNCERTAINTY where any one given particle is actually located at any given moment. (5) Generally, the particles are described in terms of wave functions, or waves of probability, in order to study and count them.

One of the most arguably astounding mysteries ever contemplated in the field of quantum physics is the situation that occurs when an observer attempts to study at a subatomic particle with a close degree of scrutiny: the particle ceases to behave as a wave and starts to behave like a particle, or a small rock, again. That is, the particle at particular times behaves as though it is composed of waves; and at other times, it behaves as though it is a small rock. This phenomenon, known as the COLLAPSE OF THE WAVE FUNCTION (5), has never been explained by scientists in a ubiquitously-acceptable way except by an overall, general suggestion that these subatomic particles appear to have an embedded intelligence that seems to know and react to the event of when they are being closely observed.

Similar explanations have held that the subatomic particles are likely to be ENTANGLED to other particles—including the particles of the OBSERVER, himself—perhaps on a multidimensional level.

A corollary to this embedded intelligence mystery later came to be known as the Einstein-Podolsky-Rosenbaum Paradox. (1) Simply put, the EPR paradox was formulated in order to explain how individual particles can having what would otherwise appear to be faster-than-light-speed communication between themselves. That explanation is that the particles are actually NON-LOCALLY CONNECTED, and therefore, are ENTANGLED.

Some time later, a highly controversial theory came to be presented, one that historically has been dismissed by mainstream physicists, that the universe is holographic in nature. The HOLOGRAPHIC UNIVERSE (6) states that every part contains the whole, and that everything is entangled with each other by means of some kind of IMPLICATE ORDER. (4, 20) This concept was envisioned most prominently by scientists such as David Bohm, Karl Pribram, and Michael Talbot, amongst others. In recent years, the theory of the Holographic Universe has gained ground as a feasible theory of a grand unified field.

SENSE MEMORY & HOLOGRAPHIC EXPERIENCES

The Works of Stanislavsky and Strasberg

Part of the architecture of the Holographic Computer System is based on the Actor's Method. The Actors Method, or The Method, as it has come to be known in the field of performing arts is widely accredited to having been invented by Constantine Stanislavsky in the later 19th and early 20th centuries (2). This Actors Method was codified in three major literary works of Stanislavsky as translated by Elizabeth Hapgood Reynolds An Actor Prepares, Building a Character, and Preparing a Role.

The Holographic Computer System is inspired, in part, by the The Actors Method and the teachings of Lee Strasberg (3) and Constantine Stanislavsky, who were actors as well. What Lee Strasberg, Constantin Stanislavsky and others were saying in essence was—without either using the explicit term holography nor the implicit terminology of a 'whole in every part' nor quantum entanglement—is that all memory in the human unconsciousness is entangled—senses, experiences, emotions. That it is in fact a hologram and that invoking one part, as by means of the senses, invokes a replay of all the parts—so as to be useful to actors portraying inner truth by associating a semblance of current events on stage with previous life experiences, as if they were living the part.

Through training senses, to be the key, you can essentially untangle the whole ball of unconscious memories and get to the embedded emotions from true life experiences that one needs to portray as an actor. And as complicated as a human being is, all it takes to unlock it—the whole—is the skill of a properly trained actor associating one or more of his/her properly tuned senses experienced in the present with those experienced in the past. So as to unlock the unconscious entanglement of a life situation or event and bring forth the wellspring of memories that bring depth and truth to the emotional life of an actor playing a role on stage or screen.

However, these truths are not just apparent to the acting field, but to other areas of artistic endeavor as well. For art in all its forms, including but not limited to, music, painting, and poetry, are at there best when the path from entangled sensory experience to creation is honestly relayed. It is this artistic quest for truth that, in part, inspired the creation of the Holographic Computer System. Because a leap in associative memory can only be made when it mimics the artistic process at its best. For anything less is disingenuous and the audience is quick to know it.

Hologram of a Problem (HOAP)

It would stand to follow that if the universe itself is indeed holographic, then, reasonably, the same can be said for all situations, events and other problems that are presented for some type of recognition and/or solution; that is, they may be entangled in one or more ways. That is simply a logical conclusion, because situations, events and other problems, like subatomic particles, are a part of the universe—even if merely by the thoughts of the OBSERVER, which thoughts are more than likely electromagnetic in nature.

Appropriately, if enough intelligence in the form of dataset material—perhaps even thoughts themselves—can be gathered about any one or more situations, events or other problems and this dataset material is converted and presented as electromagnetic delegates—real matter or energy particles connected physically to the datasets, or a more practical system of delegates referred to in the invention as DROPLETS representing the same—patterns are likely bound to exist within that said intelligence. Moreover, if the space in which these electromagnetic delegates are presented and observed is multidimensional, the patterns which are latent and unrecognizable on one dimensional level will appear as a recognizable manifestation of patterns on another dimensional level, and vice versa.

It is the concept of the inventors that Holography, a scientific technique better known and used for its ability to record three-dimensional objects for the sake of displaying whole images of those objects, can also be used as a practical means to entangle a situation, event or other problem so that it may be quickly recognized and solved. That is by making a hologram of datasets—or electromagnetically endowed delegates of the datasets which can be holographed—a wholistic representative of an entire problem can be presented in the form of an interference pattern, where each incoming data element has a connected relationship with every other. This connected relationship of the data elements—their delegates more specifically—can be explained in terms of their connected phases which links back coherently to one or more singularities, where there is a REFERENCE BEAM.

In other words, an interference pattern, or hologram, can be used—instead of for reasons of recording and reconstructing wholistic images for imagery sake—to recorded the entanglement of a situation, event or other problem. Accordingly, at any given moment in time, such a recording might capture meaningful patterns arising from the manifest and/or latent relationships that exist within and without the plurality of input datasets.

These recordings, i.e., interference patterns, can then be stored into a memory bank in a practical manner so that other information, more readily recognizable to a machine or human—such as audio/visual waveforms, recognition codes, heuristics, an so forth—are stored along with them in an associative way. After a period of time, the invention can be trained with enough said patterns so that it can be said to have gained a level of experience. Moreover, there will likely be future circumstances where new datasets presented will bear similarities to past situations, events and other problems. At this point, a holographic recording of the current situation, event or other problem can be quickly translated into a recognition status and/or solution by recalling and presenting the more easily-recognizable information previously associated and stored along with past-interference patterns that are of a close or approximate, if not equal, match.

Infinite Instruction Set Computing (IISC)

Unlike conventional computer systems, which employ processor architectures based on limited instruction sets—RISC (Reduced Instruction Set Computing) or CISC (Complex Instruction Set Computing)—the Holographic Computer System introduces the concept of Infinite Instruction Set Computing (IISC), pronounced "isk," simply because the instruction set of the Holographic Computer System can approach infinity. Moreover, unlike the noticeable machine cycle delay overhead caused by the step up of RISC to CISC, the step up of CISC to IISC does not introduce any machine cycle delay overhead whatsoever. This concept of IISC-based computing without the introduction of machine cycle delay overhead further distinguishes the Holographic Computer System as being an improvement over the conventional modern digital computer system.

Conventional digital computer systems are programmed to find solutions using pre-formatted sequences of binary programming code, known to those skilled in the art as machine language. Machine language is at the electronic level of all modern digital computer systems, and there is no Hardware Abstraction Layer (HAL) present between it and higher level programming languages such as C, and object oriented programming (OOP) languages like C++, and the like. With few exceptions, there is not much abstraction gained by using assembly language vs. direct programming in machine language. Assembly language makes machine language more humanly readable at a glance which would not be the case with discrete 1's and 0's. For most practical purposes the two languages are equivalent, and in all cases full optimization of an algorithm may be presented by either. As the lowest level language of the system either assembly language, or machine language, is the most concrete, and to all but the most accomplished experts, is generally regarded as the most difficult language to manually program in, but with the benefits that it still remains the most efficient in terms of speed of execution and also, generally, memory size requirements. Machine language has been around since the invention of the U.S.-designed, vacuum tube-based Mark I computer during World War II, and the British-designed Colossus (25,26,27) based on electromechanical relays of the same period. Granted that the processing power of computers have changed dramatically since World War II, the general concept of how the computer works at the machine language level has not changed very much at all, at least beginning with these devices or the introduction of the transistor-based ENIAC (Electronic Numerical Integrator and Computer) in the 1950s.

Machine language is still the king of all computer programming languages ever devised by man for use in conventional digital computer systems. As explained, it is a mechanism by which the Holographic Computer System operates also but by means of an entirely new concept in computer science referred to herein as IISC-based computing.

Holography

Predominantly, the principle application of holography throughout the decades has been the recording of 3D objects for the sake of displaying 3D objects, i.e., for imagery sake—not for general purpose problem solving or advanced computation, although there are a some notable exceptions where holography is used for limited pattern matching. Said field is known in the prior art as Recognition Holography, and these are discussed in this section.

The invention of holography is accredited to Dr. Dennis Gabor (9), who in 1947 created the first of what he, himself, coined by name to be a, "hologram"—from the greek 'holos' meaning whole, and 'gram' meaning picture. That is, the WHOLE PICTURE. It is said that Dr. Gabor accidentally invented the hologram while pursuing the design of an apparatus the original purpose of which was for improving images in electron microscopes. The invention is still widely used today. The type of holography Dr. Gabor invented is known as the On-Axis technique. (10,13,17) The holograms produced are generally referred to in the prior art as Fourier Holograms, named after the French scientist, Jean B. Fourier.

There are antecedent pioneers to Dr. Gabor's most notable work in a field of physical science related to holography, which science is a sub-branch of quantum wave mechanics known as diffraction. Diffraction, simply put, involves the bending of electromagnetic waves around obstacles, or objects. It is the core reason why holograms can be generated (12). Said pioneers include Sir Isaac Newton, Christian Huygens, Thomas Young, James Clerk Maxwell, Albert Michelson and Edward Morley, Augustin-Jean Fresnel, Joseph Fraunhoffer, William Bragg, to name just a few.

Beginning with the work of Emmet Leith and Juris Upatnieks (7,8) in 1961, who invented what is known as the Off-Axis technique, and Yury Denisyuk who invented the process of reflection recording on transparent photographic plates (11), holography moved into its modern form. Leith and Upatnieks first used holography for use in microwave system improvements. Later, using said Off-Axis technique, they started to make high quality visual holograms using the same technique they used with microwaves, but using the recently invented laser instead.

In order to explain the differences between the aforesaid On-Axis technique and the aforesaid Off-Axis technique, one must explain the differences in various types of electromagnetic diffraction involved. (18) The On-Axis technique of Fourier Holography requires what is referred to in the art as Far-Field Diffraction. That is, the image forming rays must come from a far-field wave source. These rays are parallel, and they may be simulated by the use of condenser lenses. Generally, Holograms generated using far-field rays are severely lacking in depth. This is the lesser known reason why the images formed by electron microscopes appear shallow. Said holograms may only be reconstructed using expensive focusing elements, or lenses such as Fourier Lenses and the aforesaid condensers. The Off-Axis technique, however, splits the image forming rays into two beams. One known as the Reference Beam, and the other known as the Object Beam. The object beam is that portion of the source rays which bombards an object field, comprised of one or more objects, and generates an object wavefront; the reference beam, rather, is the unadulterated rays coming from the source, which do not interact with the object field. Together, the two beams interfere on a holographic recording plate, the reference beam coming in at an angle, and thus said to be off-axis. The main reason why the off-axis technique produces higher quality images having robust depth versus the on-axis technique, is that the off-axis technique, because it is off-axis, generates interference patterns, or fringe patterns, containing higher frequencies and therefore contains more information carrying capacity per unit area. Off-axis holograms also may be generated without expensive condenser or Fourier Lenses, just the Reference Beam. Off-axis holograms may be generated using a point source of coherent rays. Said point source may come from a near-field as well as a far field. In the case of a near-field the technique is referred to as Near-Field Diffraction, sometimes referred to as Fresnel Diffraction.

Over the years, the terms holography and hologram have come to be arguably-misnomered as something to do merely with PARALLAX, i.e., with 3D images that appear to have depth simply by reason of having more than two observable viewpoints by reason of the properties of binocular vision. One particularly famous example of this misnomer in terminology is in recent popular media where news anchor persons have been made to appear as "holograms" by virtue of their 3D tele-presence being transmitted, or beamed up as it were, into different environments that are many miles away from their actual news-reporting whereabouts. These "holograms" are based on a relatively old technique of placing an individual in the center of a ring of multiple cameras, which cameras simultaneously record 2D images of the individual from multiple views. Subsequently, special CGI techniques process this content obtained at a remote location, along with content obtained at the base location. This 2D imagery is superimposed with the result that the news anchor appears in a different environment, holographically interacting with colleagues. Thus, the images are purported to have, and are intentionally explained as having, holographic depth.—even though the results are shown on ordinary 2D audience viewing screens. This special effect of television and cinema is but one of the many misuses of holographic terminology that pervades the field. In most of these cases, the misnomers are presented so as to give the illusion to the layman that true holographic technology is being used, when it is not.

There are key primary differences between what is termed a HOLOGRAM and what is better known as a STEREOGRAM: the stereogram appears to portray depth by reason of an optical trick, one that presents a differing 2D image to each eye of an observer having binocular vision; but a hologram, rather, actually contains and projects depth because image-forming waves, previously captured, are regenerated by the application of illuminating said hologram with a coherent reference beam. These waves are diffracted by the hologram, i.e., bent in numerous directions such that they focus and thus integrate themselves in certain actual spatial locations in physical space. These spatial locations form at the locations where external surfaces and interior transparent volumes where actual physical objects had once existed and were thus posed for recording. Thus, these reconstructed wavefronts actually reproduce the objects themselves, visually at least, and as such the subject matter may be viewed from all angles and at all depths, although with a limiting factor referred to by those skilled in the art as the Nyquist limit.

Over the decades, various holographic apparatus have been introduced that have attempted to achieve holographic television as well as holographic motion pictures. All of these have been limited laboratory-based research examples; and all have been more or less failures, either in terms of achieving true holographic results or in their practicality. The difficulty seems to be more due to the fact that the approaches used to achieve these ends are shortcuts around the core issues that need to be addressed. But this certainly does not intend to imply in any way, shape or form that the goals, themselves, are impossible.

Computer Generated Holography

Today, because of the speed owed to modern digital computers, much of the subject-matter which is portrayed for holographic viewing is generated by means of digital holography, or Computer Generated Holography CGH (7,15,18). CGH was invented over four decades ago by Lohman and Paris in 1967. In CGH, holograms are generated by means of a computer algorithm which produces interference patterns of the subject matter being holographically recorded. This subject matter is usually virtually-real in nature. After generation, these artificial interference patterns are transferred to a printable or photographic medium. This medium then is capable of diffracting light rays so as to reconstruct these virtual objects in space, as would a normal hologram generated by means of using physical rays interacting with real world objects.

The computations involved in CGH usually take vast amounts of computer machine cycles in order to produce suitable interference patterns. This is because every image forming pixel must be integrated with every ray that is emitted or reflected from every image forming point constituting the subject matter of the hologram. Owing to this problem, many shortcut methods have been devised. In fact, many of the shortcuts are taken to dramatic extremes where one can say that many of the techniques and image displays produced by what are errantly referred to as "CGH" are not truly holographic, but are rather what are classed as Holographic Stereograms. These types of stereograms have more than the mere two viewpoints commonly found in traditional stereograms. This plurality of viewpoints are usually, however, still only comprised of 2D images; and in most cases special masking apparatus, usually of a bulky or clumsy nature; is required to separate each viewpoint so that two may be presented to each eye at a time. In other cases, these Holographic Sterograms may be indeed be regarded as actual holograms but they are of the type which yield very limited depth of reconstruction in physical space. Of this variety, certain techniques fair better than others. One of these is the CGH technique known by practitioners in the field as Diffraction-Specific Holography, which although generates reasonable quality holograms, they can only be viewed from a rather confined latitude of viewing angles and viewing depth. Also, the image is usually composed of pixels of somewhat limited resolution. The Diffraction-Specific technique produces holograms rather quickly by limiting the viewpoints and the depth of field of the subject matter so that the interference pattern may be produced by a less computationally-intensive, and therefore less time-consuming, rendering session. Another type of CGH Holography is referred to as Fourier Holography, which has an analog in physical holography. This type of holography is the general basis of Dr. Gabor's original invention in 1947. In Fourier Holography, whether or not the interference pattern is generated by CGH or physical light rays, physical lenses—known to those skilled in the art as 'Fourier Lenses'—are required to actually view the hologram. The interference pattern in this type of holography is usually an optical Fourier Transform positioned at the common focal point that arises between two of these lenses. The rays, physical or virtual, must also be made parallel with respect to the optical axis, by means of a condenser. Said lenses and related apparatus are usually huge, heavy, and expensive. The way that Fourier Holography works, recording and reconstructing subject matter depth at exact spatial locations is not generally possible. This is a major disadvantage.

Interference-Based Holography

There are prior-art interference-based CGH diffraction techniques that inefficiently rely on a hybrid mixing of dedicated far-field and dedicated near-field diffraction, such as by combining Fraunhoffer and Fresnel integrals. Secondly, although conventional ray tracing has been used in the past to help generate CGH holograms, the algorithms involved appear confined to using object points spatially positioned on even phase boundaries, i.e., at phase zero, and thus the reference beam is implied, as distant parallel rays inbound from a far field. These objects thus become self-emitting point sources of coherent rays. Such holograms are generally not robust, since they require illumination by parallel, i.e., Fraunhoffer, rays, to accommodate the rigid phase boundaries. To reproduce them on film or plates, or by use of a spatial light modulator (SLM), usually requires expensive condenser lenses. More preferable is to use a faster and more robust CGH technique coined by the inventors called Phase Tracing. Much computer intensive math can be saved in this process of generating an interference-based hologram by using said technique, which includes the use of a Phase Accumulator Table (PAT), and is altogether defined integrally as part of this invention. The first advantage gained by the Phase Tracing technique is that object points may be spatially situated anywhere within the object space, i.e., Common Dimensional Space (CDS), and, therefore, do not need to be rigidly situated on even wavelength boundaries as respects the prior art. The second advantage is that object points can occupy any location within the dimensional space, implying combined far-field and near-field diffraction potentiality. The third advantage gained is that object point reconstruction is surgically precise.

Partial Destruction of Holograms

The real proving test that distinguishes a genuine hologram, from one which purports to be one but is rather a stereogram, can be easily achieved by simply DESTROYING part of the interference pattern, i.e., the hologram itself. If the hologram is recorded on a glass plate, one may smash it with a hammer into pieces of various sizes. One may then shine the original REFERENCE BEAM—coherent wave source—through each piece in turn. In the true hologram, each of these individual broken pieces will reveal the entire object from its unique vantage point in space. In fact, by moving one's eye as close to any given piece as may be practicable, the image revealed is quite similar to the effect of one looking through a window into another world. One can look all around from behind this window and see objects off to the sides, off to the top and bottom, and at every other conceivable angle in between. The larger pieces of the broken hologram will reveal more information, and thus will be clearer, whereas the smaller pieces will be more fuzzy. This is because one piece or other, depending purely on its size, will have more information points or pixels, i.e., fringes, each of which is capable of diffracting light rays—wavefronts—into forming the reconstructed objects in space by means of integration. With less information points or pixels, there will be less diffraction-capable fringe information and, therefore, less integration of rays. This test will work with any type of genuine hologram, whether recorded on a glass plate or on a celluloid film. What the test demonstrates in fact, is that no matter how the hologram is subdivided, all parts contribute to a WHOLE PICTURE. Each of these parts, even down to the pixel level, theoretically, record the WHOLE PICTURE from that parts unique vantage point(s). Altogether, this amazing and phenomenal property—being able to reconstruct a WHOLE FROM EVERY PART—is what makes holograms useful and reliable as data compression tools, one of the more impressive applications in recent years being Holographic Memory.

Problem Solving Uses of Holography

Using holography for general purpose problem solving is an altogether unique application of the science of holography, one which quickly differentiates itself from the more conventional purposes of holography such as recording 3D objects for 3D imagery sake, or for use as diffractive elements in image or waveform corrections as by means of lenses, spectral filters, diffraction gratings and the like. Holography has been used in measurement and in non-destructive testing, i.e., interferography(16), where comparisons of objects with their interference patterns can help pinpoint stresses and other physical weaknesses. There have also been lesser computational uses made of holography in a pattern matching sub-branch known as "recognition holography." Recognition holography essentially involves generating a hologram of an original object and then at a later time comparing it with other objects. By illuminating the different object with the same reference beam that is situated in the same proximity and angle with respect to the original recorded object, and having the original interference pattern also being in its same original location, the second object can be quantitatively measured for comparison sake using a photosensor, or a neural network (21,22,23) in some simple cases. The amount of light that passes through the hologram represents the degree of recognition as to the original object. In the case of neural nets, it is the firing thresholds which are counted to give a similar recognition.

Multiple Vantage Points

By making holograms of the problem, which holograms are stationed at various locations throughout the Common Dimensional Space (CDS), the Holographic Computer System is essentially able to LOOK at the WHOLE problem from numerous vantage points. That is to say, each hologram recorded acts as a unique SCRUTINIZER or OBSERVER of the problem. In any given field of human endeavor, whether art or science, it has been known as an old addage that TWO HEADS ARE BETTER THAN ONE. It should follow that perhaps, in some cases at least, MANY HEADS ARE BETTER THAN ONE. In the case of the Holographic Computer System, each observer may notice something that others do not.

Problems facing modern man—cures for diseases such as cancer, cancer research, medical diagnosis, financial analysis, visual intelligence, weather prediction, artificial intelligence, trend prediction, predictive analysis and what have you—are essentially founded upon a science known as pattern recognition. What makes solutions to problems so hard to find in these various fields is that even with the most powerful and advanced supercomputers, which are at best still conventional computers by function, there still needs to be one or more human operators, programmers, and field-specific experts in the chain of preparation whom are sample taking, and analyzing patterns in search of solutions. Such research requires special setups to be prepared for every unique situation of any given category, yet the conventional computer systems in use, even be they supercomputers, do not have autonomy nor general intelligence capable of finding hidden and subtle relationships that provide the operator with unexpected clues. Therefore, it is safe to say that a vast entanglement of data taken over time and captured from different viewpoints would reveal patterns and/or synchronisms that point the human operator(s) to outcomes previously over looked.

These viewpoints, as described, are within the various holographic recordings within the description space of the invention, i.e., these sub-holograms which record the situation, event or other problem from various vantage points at different times may capture visual, audio, touch, smell or taste dominance while others may capture more dominance in terms of abstractions. The end result being a solution or partial solution that may be taken from all the input data at all layers and vantage points, whether dominant or not, since a dominant object at one moment may well prove to be less dominant when entangled at different times and vice versa.

However in the real world experts are frequently miffed by problems and situations which are so layered and complex that not all details can be discerned or analyzed at once from different points of view. One expert may be skilled at recognizing certain layers at a given time, while another expert may be skilled at recognizing other layers at another time, yet few, if any can recognize all the hidden layers as a whole all the time. Therefore, it goes without saying that analyzing the entangled whole of a problem from different viewpoints over time would undoubtedly reveal surprising and hidden relationships that would otherwise go undetected, thus making the likelihood of a solution to the problem substantially greater.

The core concept of the Holographic Computer System is that learning, recognition and/or solution of any given situation, event, or other problem is made possible by making one or more unique HOLOGRAMS OF THE PROBLEM, i.e., holograms of the respective DROPLETS (Data-Representative-Object-Particle-Liking-EnTanglement) which are delegates of the problem. Part of this holographic essence of the HCS is achieved by making any desired plurality of holographic recordings, each recording having a unique location in multidimensional space. As such, the system can be said to LOOK, holographically, at any given situation, event, or other problem, for the sake that it does so from a variety of vantage points. However, the deeper essence of the Holographic Computer System is that every individual hologram that is made represents the ENTANGLEMENT of the data points of the problem as a UNIFIED WHOLE; in other words, the HCS captures the INTELLIGENCE WAVEFRONT of the problem by means of actual scientific holography.

BRIEF SUMMARY OF INVENTION

The Holographic Computer System (HCS, or "the system") is a method and apparatus used for recognizing and solving problems.

The first goal of the invention is to acquire a wide latitude of datasets in a plurality of knowledge domains having to do with situations, events and other problems.

Another goal of the invention is to convert all or part of the data which is input into objects which have spatial properties that permit them to be entangled wholistically in a manner that approximates or emulates quantum theories of interconnectedness of all things, known as entanglement. This wholistic entanglement is regarded in the invention as Stimulus A. It is here noted that Stimulus A may be wholly or in part, derived from Stimulus B, explained below.

Another goal of the invention is to also acquire a wide latitude of datasets in a plurality of knowledge domains having to do with possible solutions to said situations, events and other problems. These solutions, in the form of human readable and/or machine readable waveforms, codes and other data, are regarded in the invention as Stimulus B. It is here noted that Stimulus B may be wholly or in part, derived from Stimulus A.

A main goal of the invention is to store data and information by reason of associating pluralities of Stimulus A with pluralities of Stimulus B so that a large knowledge base of situations, events and other problems along with potential solutions to the same is created over time.

The primary goal of the invention is to subsequently be able to recognize similar future situations, events and other problems as they occur so that the system may recall any plurality of Stimulus B from the broad knowledge base, be it filtered or unfiltered, processed or unprocessed, as useful solutions and/or partial solutions in the form of human readable and/or machine readable content.

A further goal of the invention is that it acquire enough machine intelligence making it suitable to be applied, with additional connective hardware, as the information processing architecture of robots and unmanned vehicles. Said robots and unmanned vehicles would therefore be capable of autonomously exploring, analyzing, and acquiring the varied and numerous data rich environments of all types of real and virtual worlds for the use and benefit of serving mankind. (19)

The definition of situations, events and other problems has wide meaning within the scope of the invention, ranging from the highly simple to the highly complex, and ranging from the highly concrete to the highly abstract. Essentially, there is no limit to the types of problems that may be presented to the HCS for solution or partial solution.

Although concepts of holographic computing by reason of holographic memories, holographic data storage, and pattern recognition have been around for quite some time, the HCS is a novel concept in computing science because it is a general purpose problem solving apparatus, as is a conventional digital computer system. Although the HCS might be properly classed as a quantum computer, it works using different principles than those embraced in the prior art of quantum computing which principles pertain to problem solving that centers on the use of pure Boolean mechanics (24), as do conventional digital computers; the computational backbone of the HCS is the entanglement property of holography combined with more or less conventional analog and digital computing techniques. A general background in the principles of entanglement, as it relates to quantum physics, is necessary in order to more fully understand the invention. This is given in the background section. The HCS is also practical enough that it may be made very small or very large depending on the depth of knowledge it is allowed to acquire. Thus it is suitable as a practical home computing device as well as for industry. It can even be configured to work on pre-existing cloud servers and mobile devices. Although any type of holography may be used to implement the entanglement wave functions of the system, it is preferred that interference-based holography be used. Said holography can employ various Computer Generated Holography (CGH) techniques, as well as physical holography, or hybrids thereof.

An early forerunner to the HCS is a pattern matching technique known as Recognition Holography, which centers on using holographic interference patterns with or without associative memories—perceptrons, neural networks and the like (21,22,23)—to compare and/or classify simple physical objects. There are various examples of it throughout the prior art, and much having to do with non-destructive materials testing and analysis. However, for situations, events and other problems having to do with general purpose problem solving of deeper orders of magnitude, the HCS is a novel implementation of such techniques. Problem formulation and pattern recognition in the HCS embodies a novel combination of components with a paradoxically purer simplicity, but overall higher complexity over the prior art. Altogether, the HCS serves for versatility and practicality as a general purpose problem solving computer.

Moreover, the HCS is a much faster method of computing than the modern digital computer system or even its theoretical equivalent in quantum computing; because none of these systems are fully capable of wholistic recognition of problems—the types of problems encountered in the everyday world such as secure communication systems, visual and sound recognition, situational awareness systems, analysis and prediction systems, machine intelligence systems, entertainment systems, biometric, bionics and various other forms of data analysis.

As indicated above, computation is accomplished in the HCS by means of entanglement, i.e., an enfoldment, of one or more of the input data elements and/or datasets that are presented to the system. This is done by holography.

First, data elements and/or datasets that relate in some way to the situation, event or other problem are collected from any type of environment, which may be of a real-world and/or virtual-world nature.

Second, point/particle-based avatars, or delegates, that relate to the said input data elements and/or datasets are then generated, which can be said to be connected to said data. Said avatars, or delegates, are objects having properties such as spatial position, orientation, movement, acceleration, amplitude, frequency, absorption and emission rate, grouping, occlusion, weight, mass and gravity, attraction and repulsion amongst others. Said avatars, or delegates, and their electromagnetic properties are given so that the data may be presentable as actual multidimensional objects in space which can be recorded holographically. Said avatars, or delegates, then interact with energy from coherent rays. Said coherent rays may be presented from independent electromagnetic sources such as real or virtual lasers and the like; however, any or all of said avatars, or delegates, may be self emitters of said coherent rays. Also, said avatars, or delegates, may interact with each other by virtual and/or mechanical methods. Moreover, said avatars, or delegates, may be real physical objects or virtual objects.

Each of the aforesaid avatars, or delegates, representing the original data elements and/or datasets of the situation, event, or other problem are referred to in this invention as a DROPLET ("DROPLET" or plural "DROPLETS") which stands for Data-Representative-Object-Particle-Liking-En-Tanglement. The acronym is coined by the inventors and is intended to honor the late physicist David Bohm who demonstrated an entanglement/disentanglement device where ink drops are dissolved and reconstructed within a glycerine medium.

Third, the DROPLETS are placed in a description space, referred to as a Common Dimensional Space (CDS). Said placement of DROPLETS can be configured to take on any form desired including that of object clouds, object clusters, object groups, object layers, object hierarchies, and/or object trees amongst others.

Fourth, coherent rays are introduced. The DROPLETS actively emit said beams and/or they passively interact with them. This results is the HCS generating a wavefront which may be captured by means of holographic recording apparatus. Because the DROPLETS are intelligent by nature, the said wavefront is also said to be intelligent.

Fifth, this INTELLIGENCE WAVEFRONT, or wavefront representing the situation, event, or other problem, is captured as an ENTANGLED WHOLE by means of making one or more holograms of it.

Sixth, the resulting hologram, or plurality of holograms, is scanned and then converted from their analog state into one or more binary machine language instruction codes, referred to as HOAP (Hologram-Of-A-Problem) Codes.

Seventh, using an Entanglement Translator (ET), which embodies an Instruction Register and an Associative Memory, the HOAP Codes are processed. The ET essentially unfolds, or untangles, the holograms in a way that quickly translates the hidden or manifest relationships within the interference patterns into human readable and/or machine readable data. This data—audio-visual waveforms, heuristics, recognition tags and/or instruction codes, etc.—is presented as a solution.

Eighth, the DROPLETS' properties are updated according to changes in the data elements and/or datasets that are input; and/or according to changes within the DROPLETS themselves; and/or according to feedback, full or partial, of solutions obtained.

The entire process is then repeated as many times as necessary to obtain as many solutions, or intermediary solutions, as desired.

DETAILED DESCRIPTION OF THE INVENTION

Figure 1:
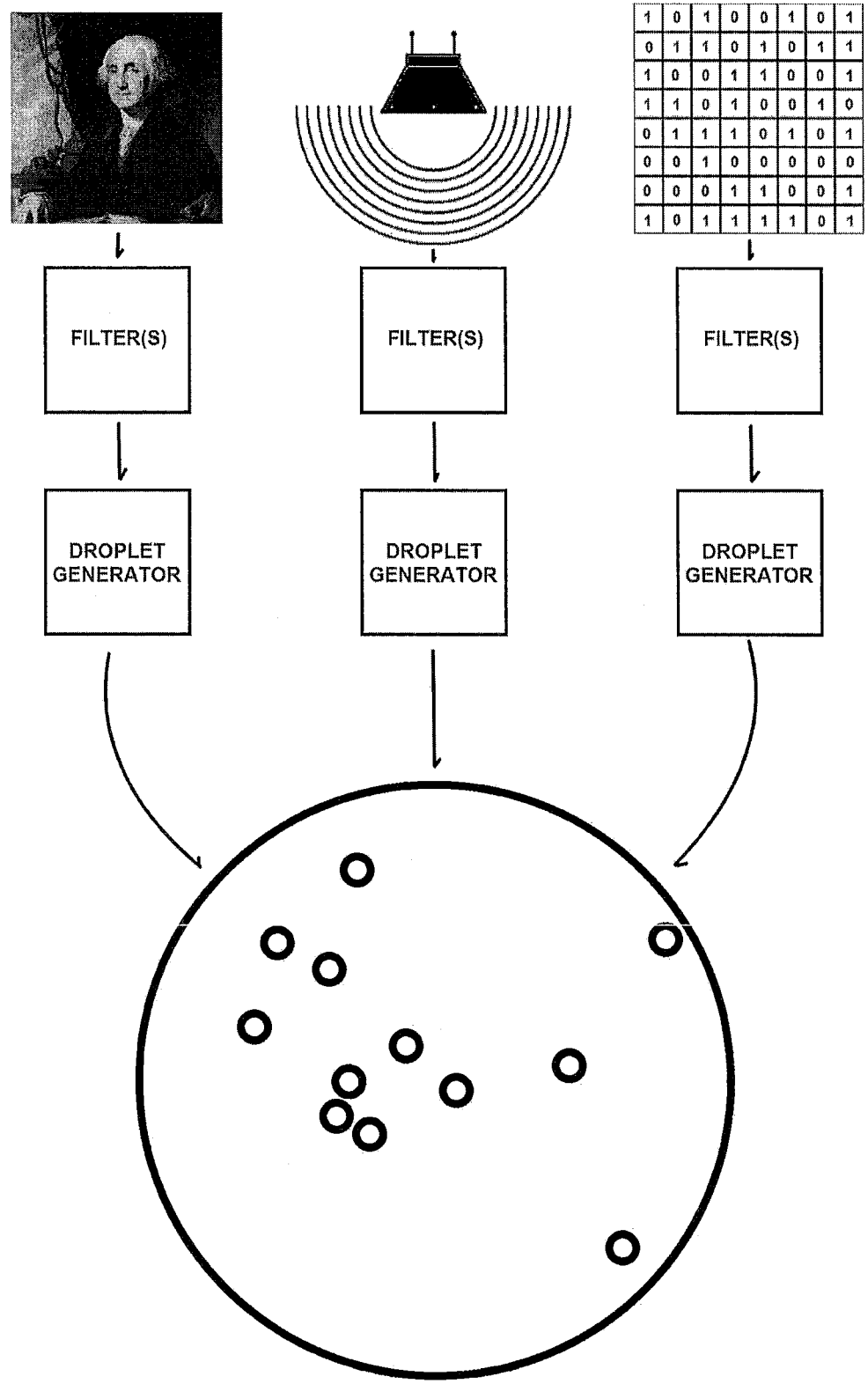
FIG. 1 Stimulus A (1) consisting of various types of input sources connected to (2) filter connected to (3) droplet generators (4) connected to droplets contained in (5) common dimensional space; passive droplets (6); active droplets;(7).
Figure 2:
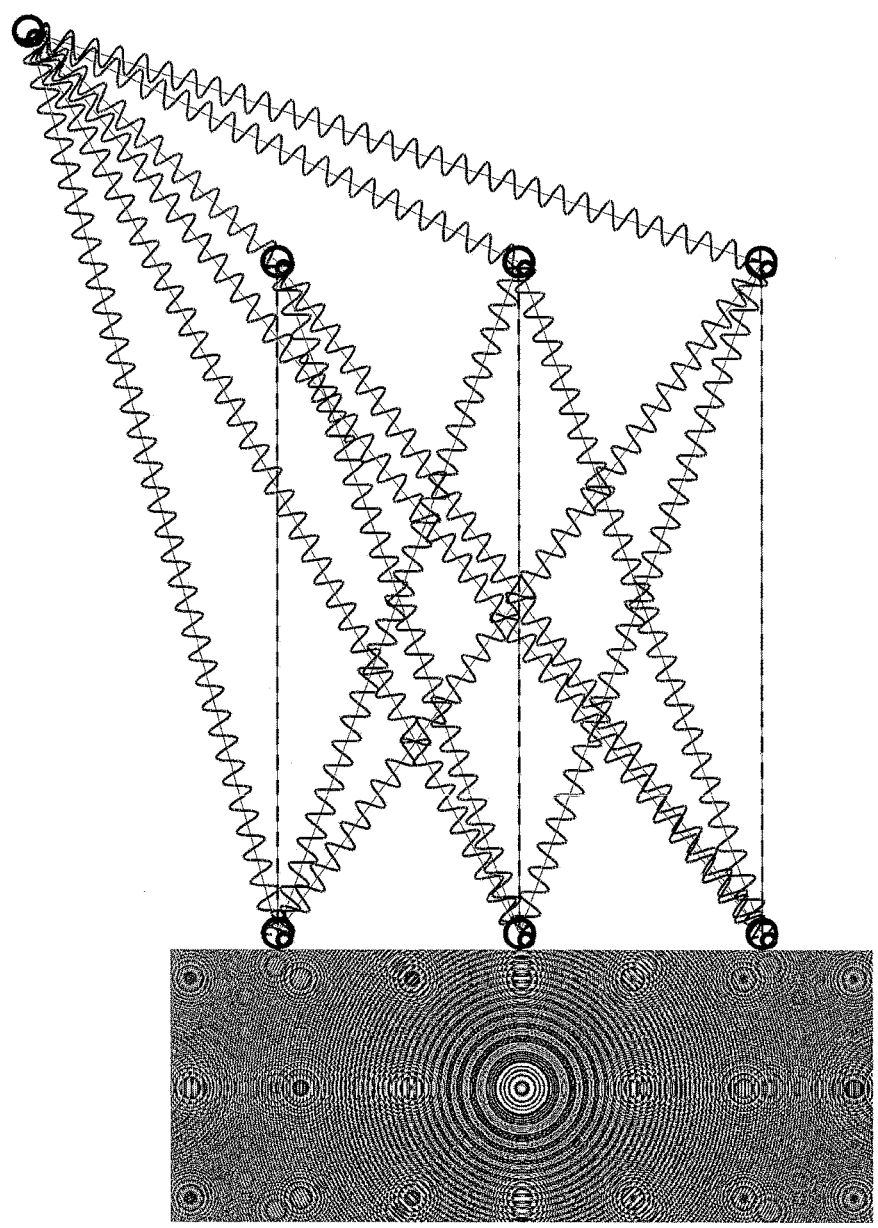
FIG. 2 A visual example of interference based hologram demonstration depicting; reference beam (8); three object points (9,10,11); and three hologram points (12,13,14); from a hologram (15).
Figure 3:
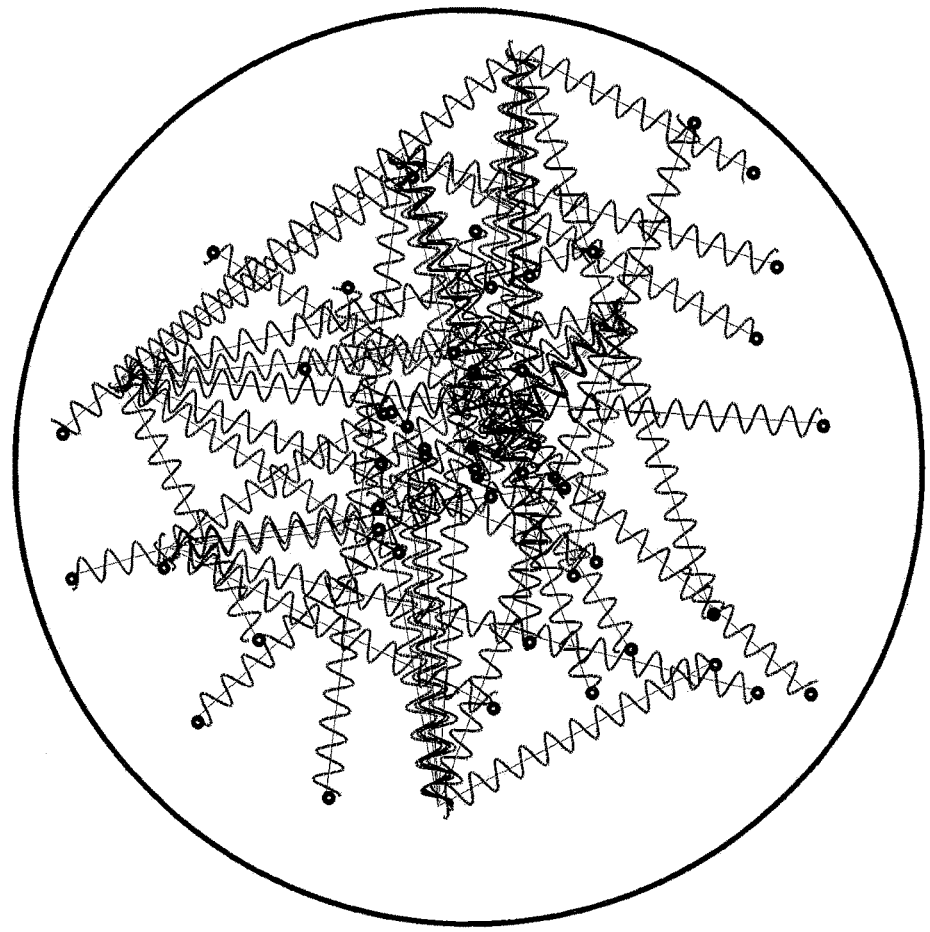
FIG. 3 Many droplets (16) contained in a common dimensional space being bombarded by (17) numerous reference beams born by active droplets resulting in a hologram (18).
Figure 3:
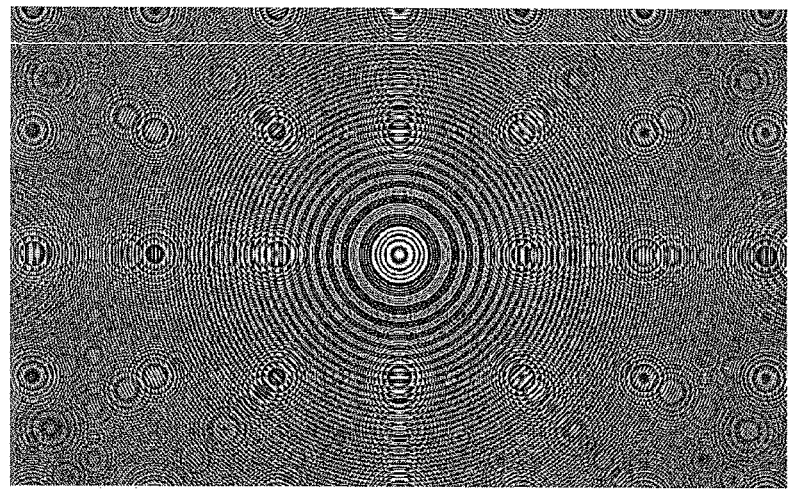
Figure 4:
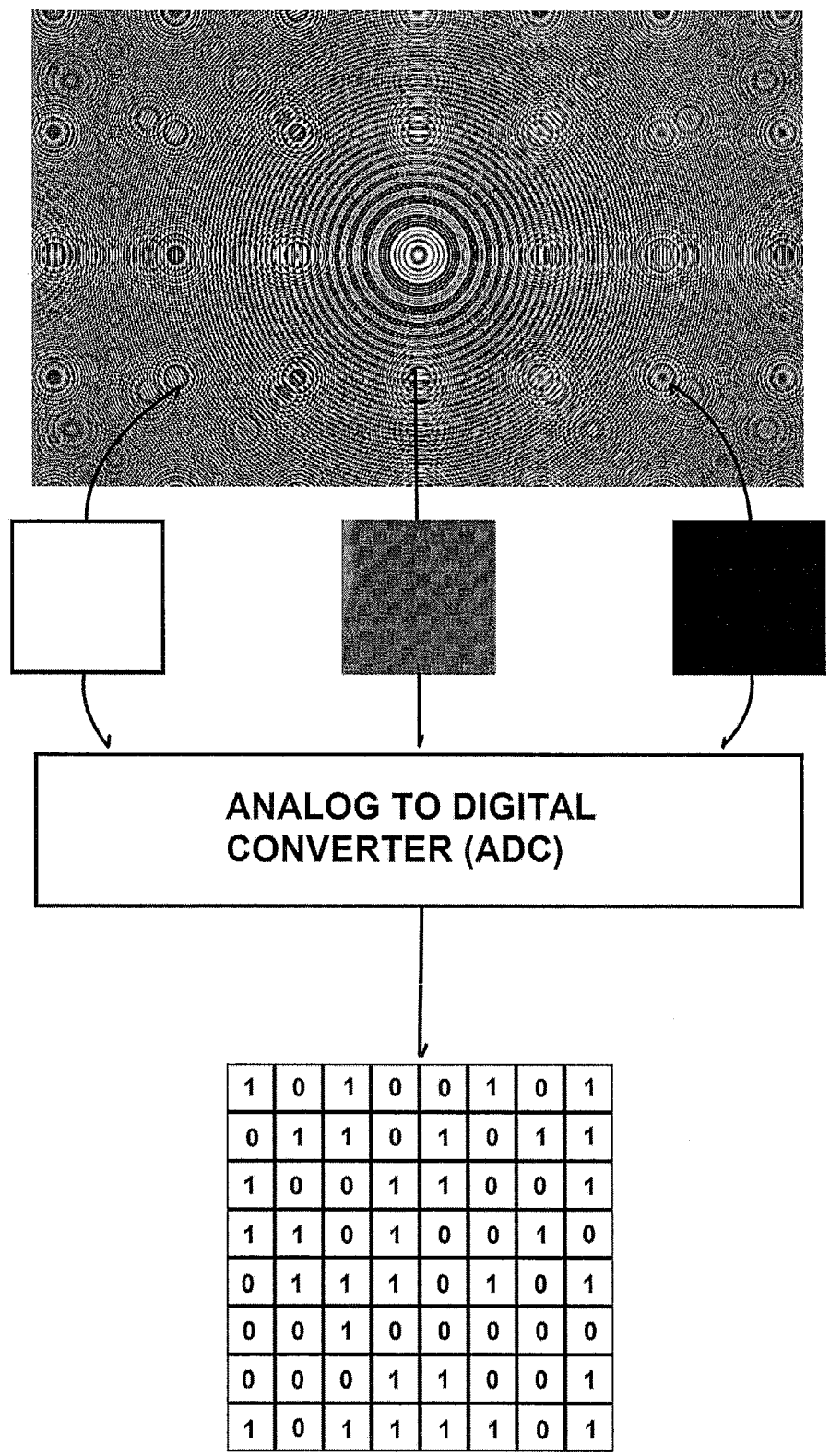
FIG. 4 A visual example of the conversion of a hologram (19) to HOAP code (20).
Figure 5:
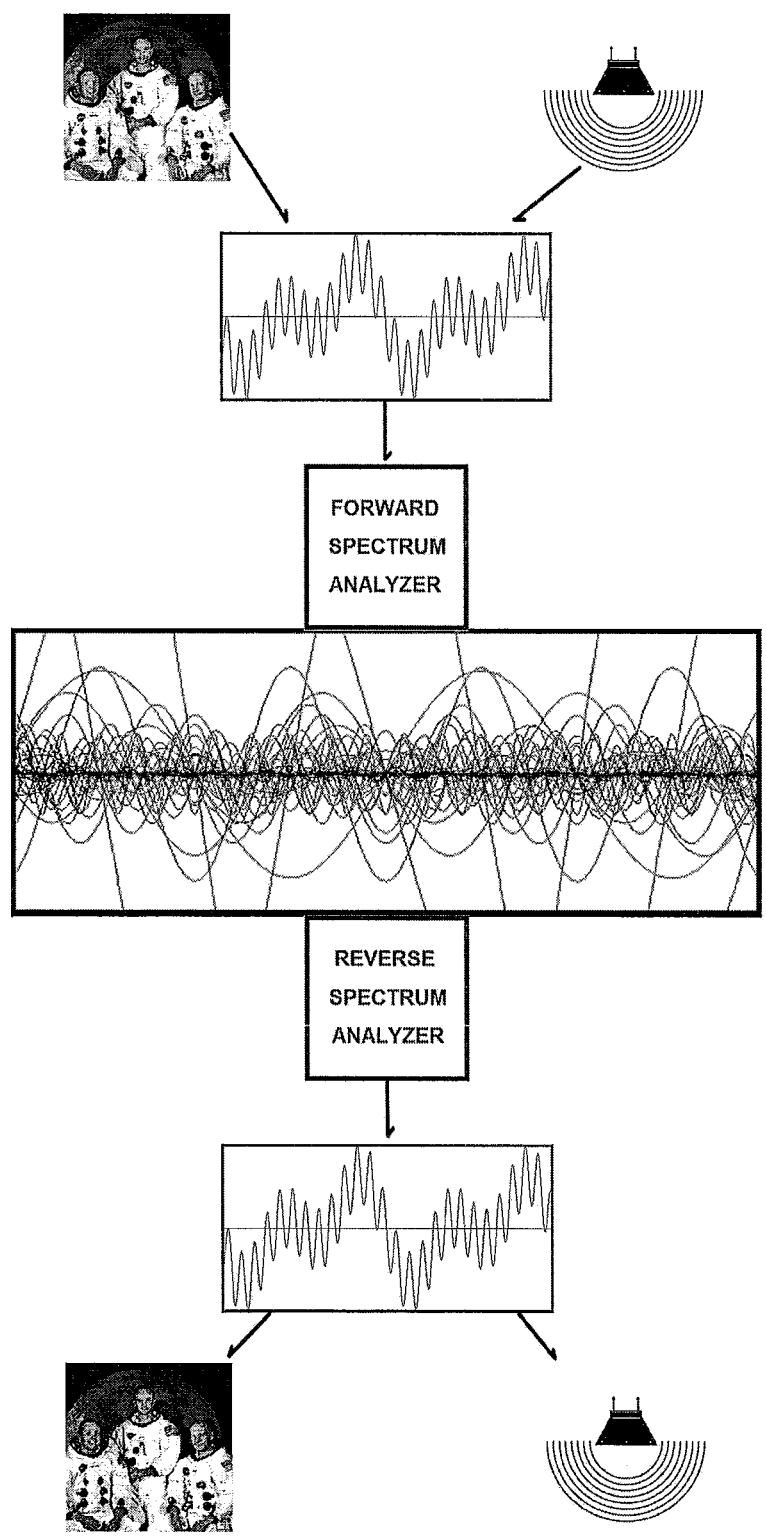
FIG. 5 A visual example of Stimulus B, sound or image (21) converted to a waveform (22); converted through a forward spectrum analyzer (23) to harmonics (24) back through a reverse spectrum analyzer (25) back into a waveform (26) back into image or sound (27).
Figure 6:
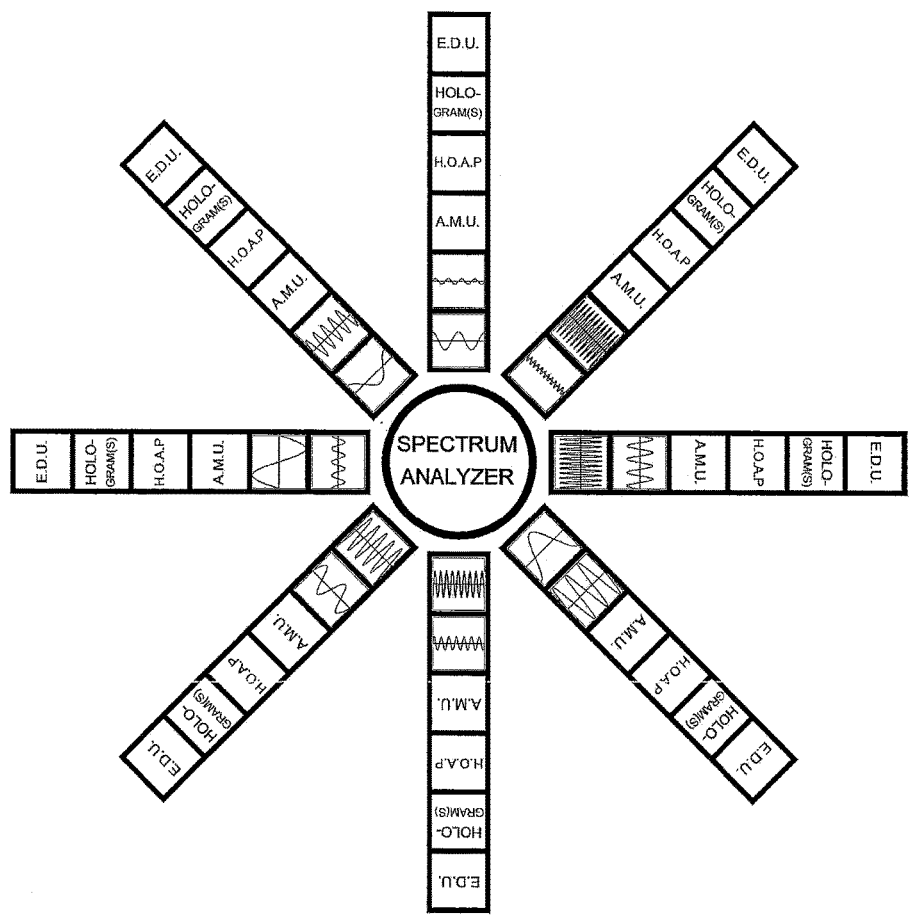
FIG. 6 A visual example of harmonics (28, 29, 30, 31, 32, 33, 34, 35) distributed in spread spectrum manner through out HCS modules (36, 37, 38, 39, 40, 41, 42, 43) and a central spectrum analyzer (44).
Figure 7:
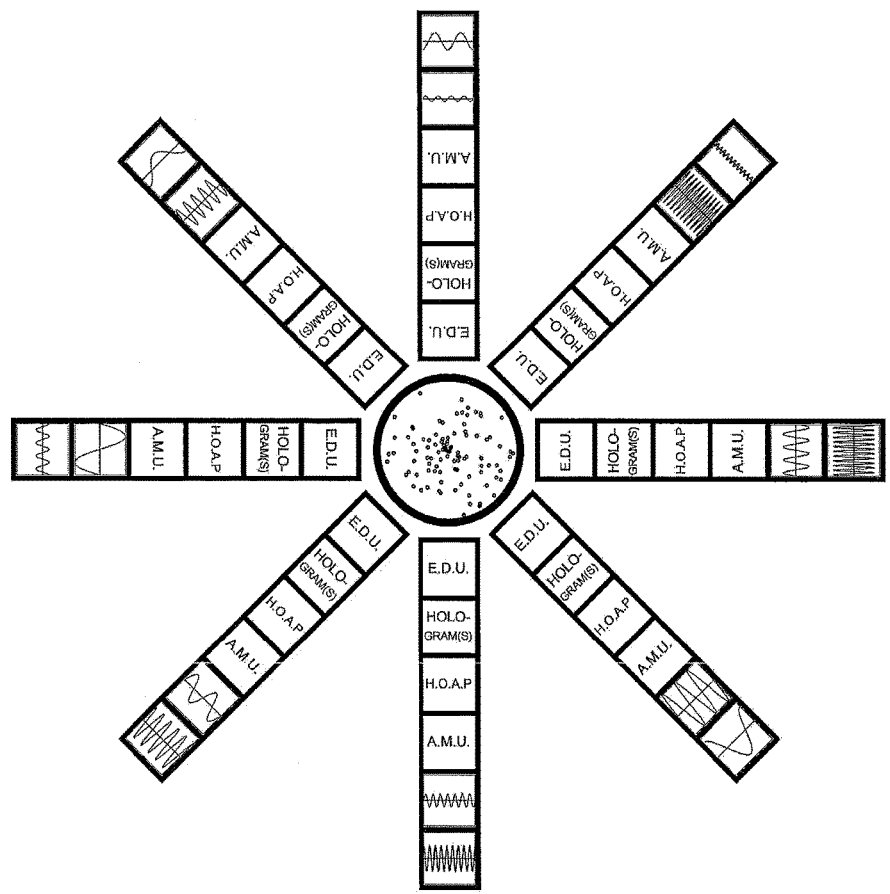
FIG. 7 A visual example similar to FIG. 9 depicting common dimensional space at center with DROPLETS (45).
Figure 8:
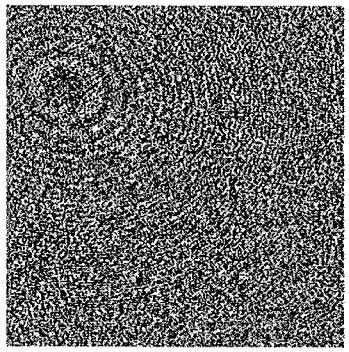
FIG. 8 A visual example of the wholistic entanglement nature of holography. Similar holograms (46, 47, 48) showing various destructive degradations and corresponding reconstructions (49, 50, 51).
Figure 8:
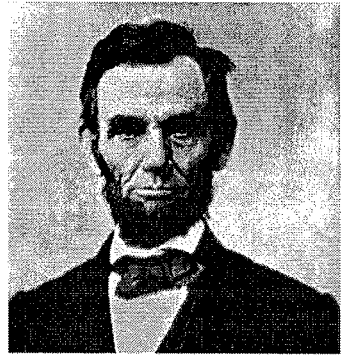
Figure 8:
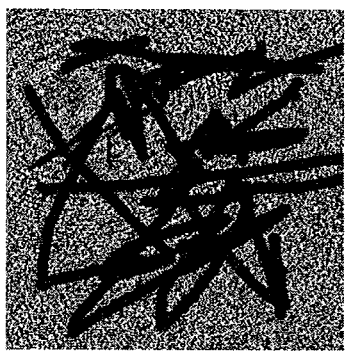
Figure 8:
Figure 8:
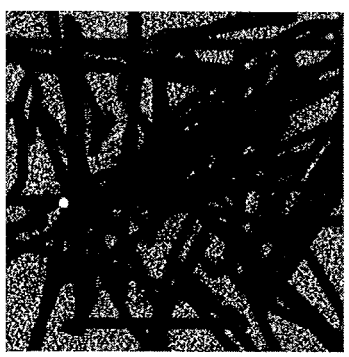
Figure 8:
Figure 9:
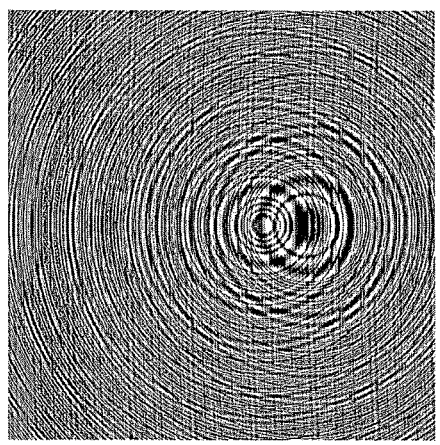
FIG. 9 Four examples of holograms produced by HCS (52, 53, 54).
Figure 9:
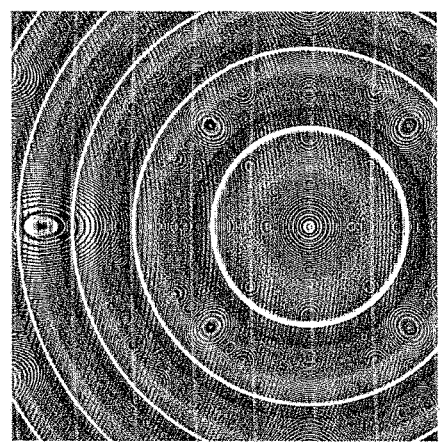
Figure 9:
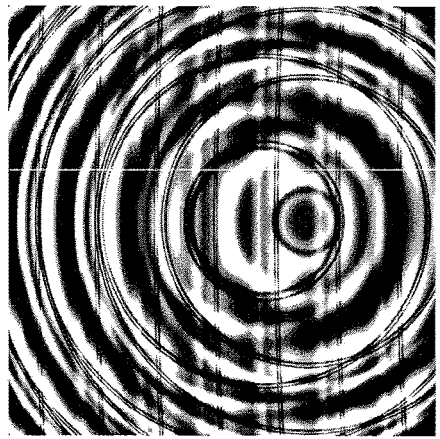
Figure 9:
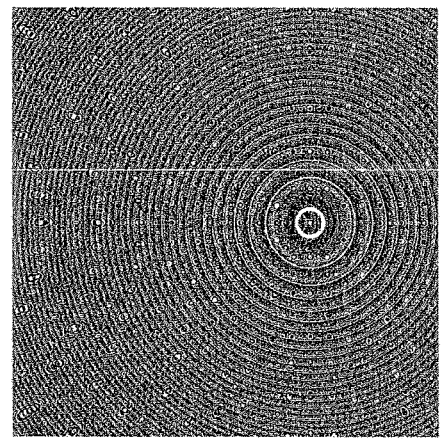
Figure 10:
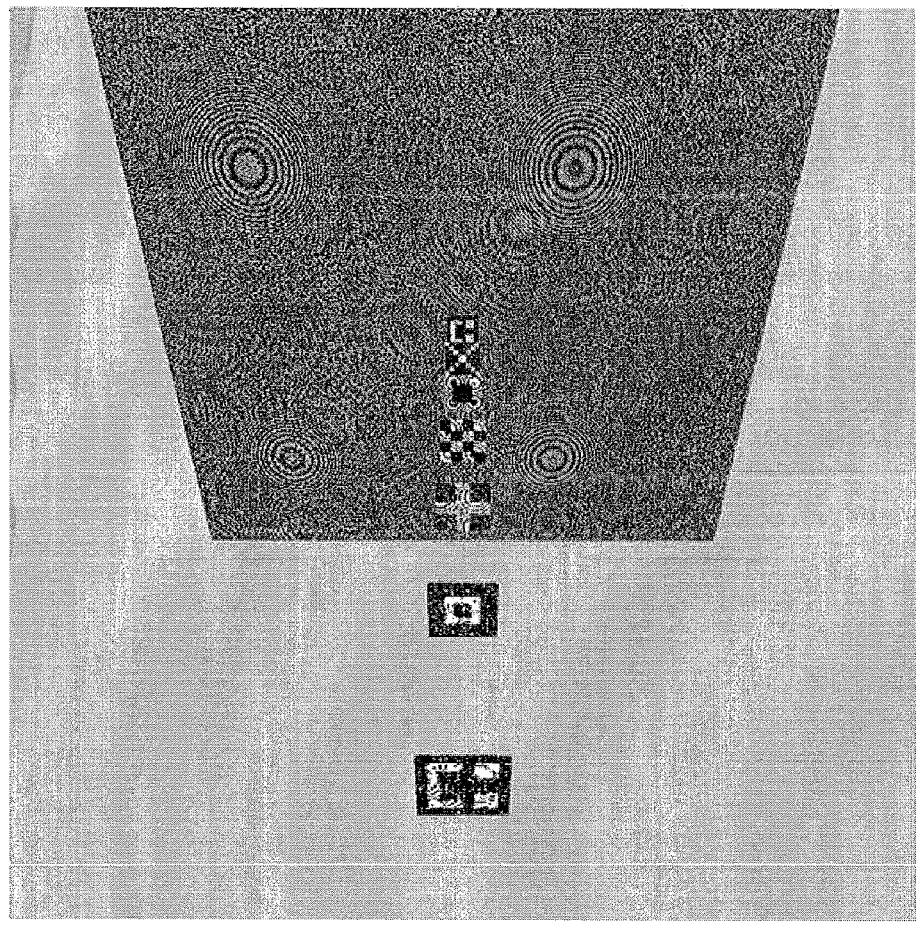
FIG. 10 A depiction of reconstruction of machine codes (55) in multi-dimensional space stored in a hologram (56).
Figure 11:
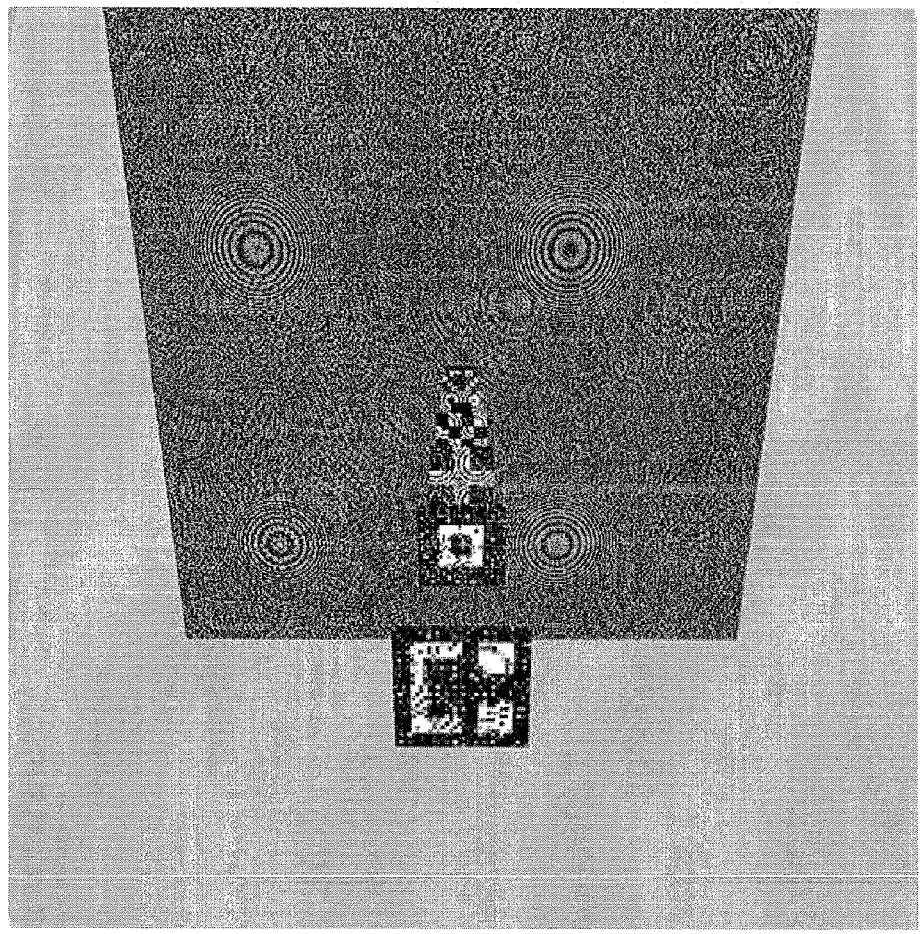
FIG. 11 A similar depiction as FIG. 17; machine codes (57) and hologram (58).
Figure 12:
FIG. 12 A flow chart of the general processing scheme of the HCS from input sources to solution (59).
Figure 13:
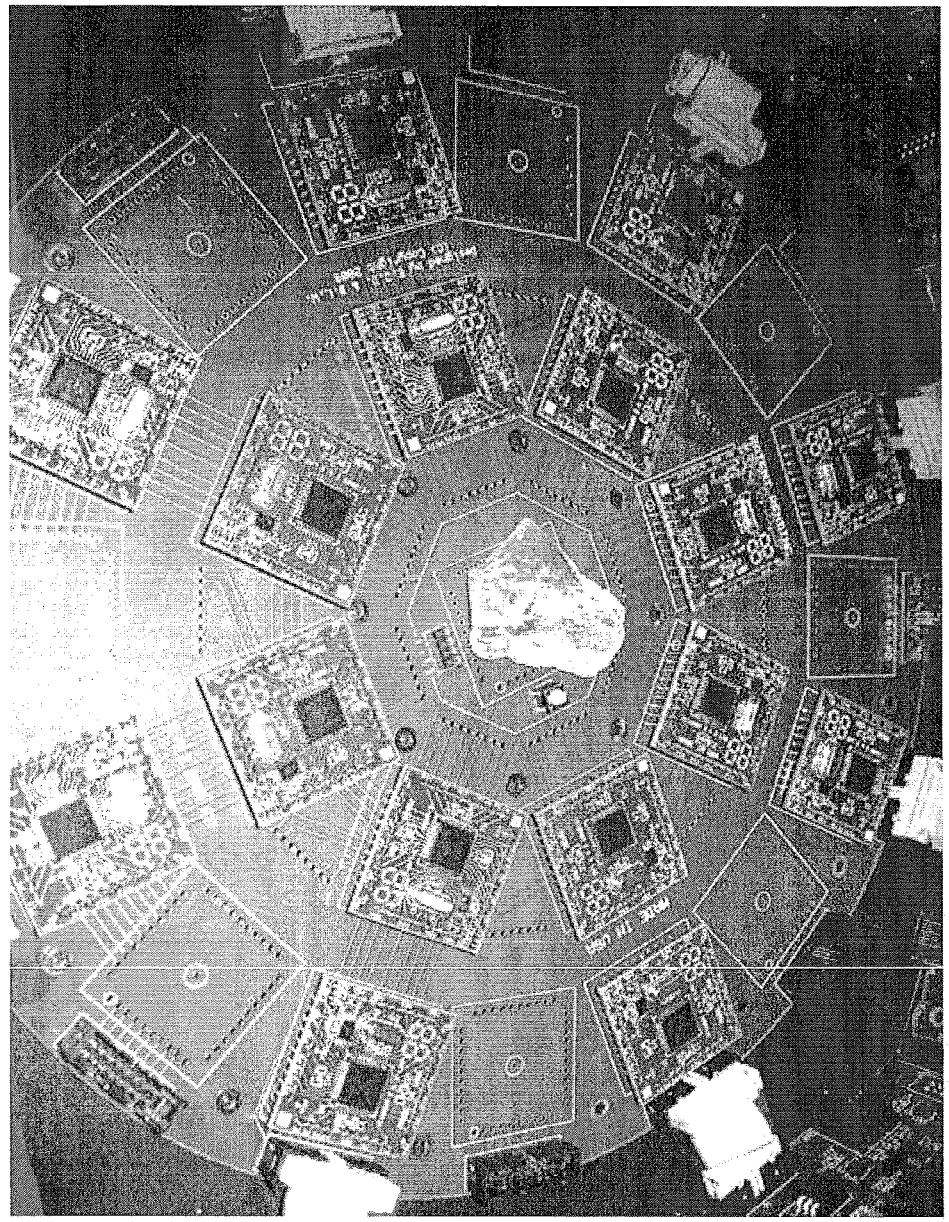
FIG. 13 A photographic depiction of HOLONEER 1 Patent model (60). The quartz crystal at center represents DROPLETS to be bombarded by more reference beams (unseen).
Figure 14:
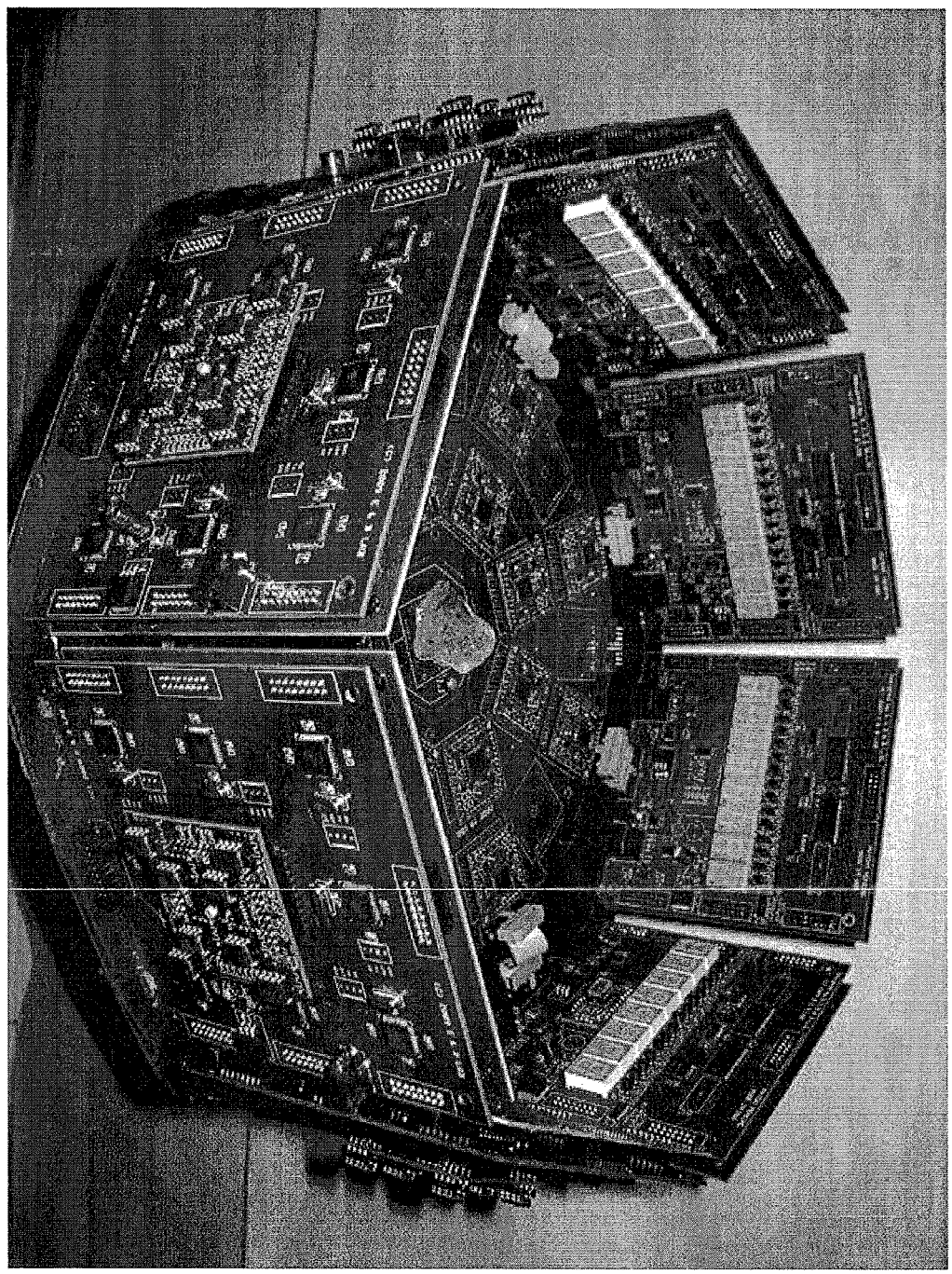
FIG. 14 Another photograph of the HOLONEER Patent model (61).
Figure 15:
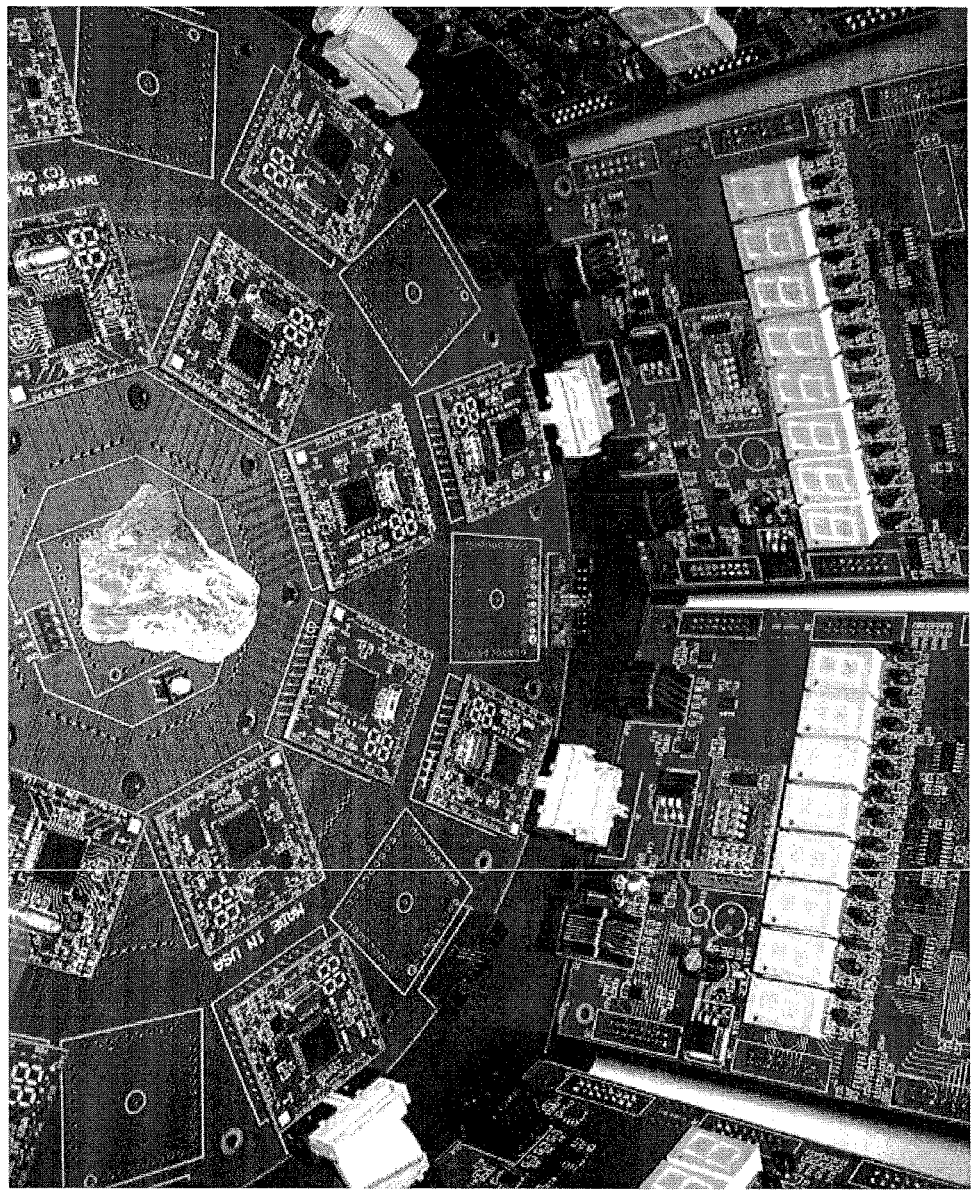
FIG. 15 Another photograph of the HOLONEER Patent model (62)
Figure 16:
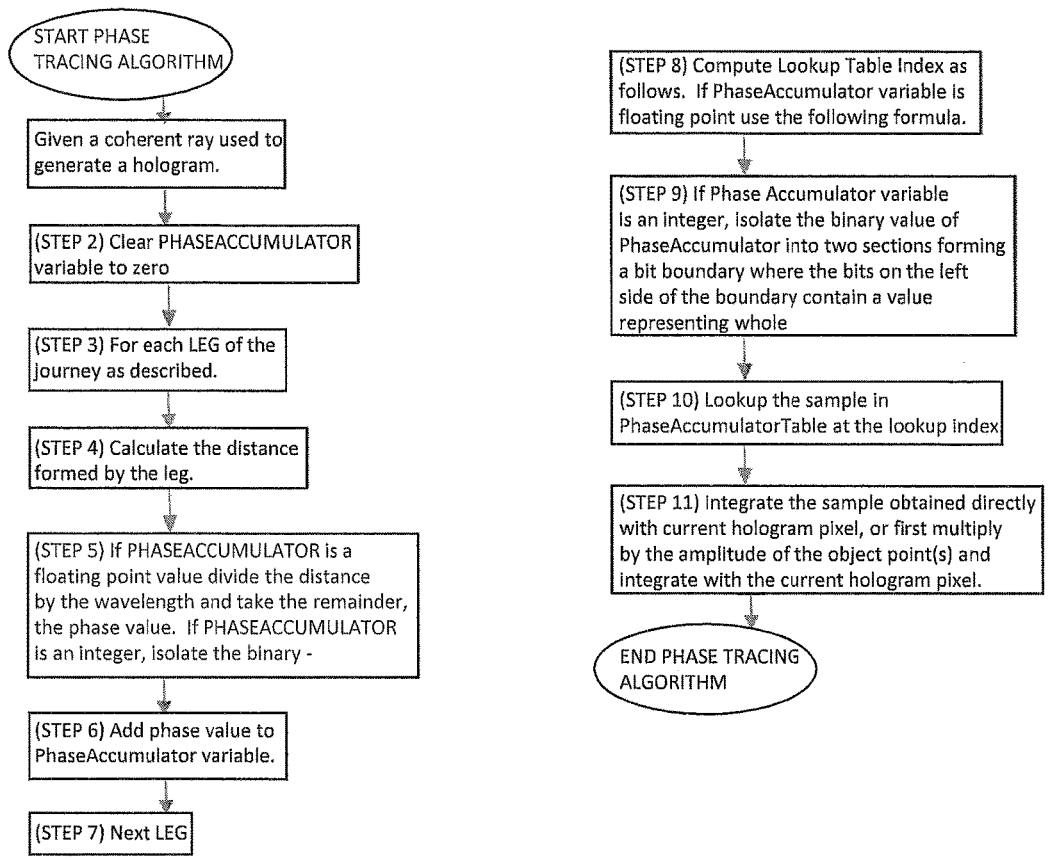
FIG. 16 Flowchart of the Phase Tracing algorithm (63, 64, 65, 66, 67, 68, 69, 70, 71, 72, 73).

One or more data elements and/or datasets are acquired as input and may be preprocessed or filtered as desired. These data elements and/or datasets are collected by means of input apparatus, such as keyboards, scanners, communications networks, and sensory devices amongst others.

In certain cases, where the input data elements are waveforms, they are converted into pure harmonics, i.e, spectral components each containing a pure amplitude and a pure sine and/or cosine frequency. This is performed by one or more forward spectrum analyzers. These harmonics are saved, temporarily. As explained more fully, a reverse spectrum analyser later is used to reconstruct the said waveforms. The forward and reverse spectrum analyzers may be replaced by a computer or processor running a computer program such as a Discrete Fourier Transform, FFT (Fast Fourier Transform), or any other algorithm suitable for the purpose. They may also be replaced by a suitable apparatus incorporating the use of one or more Spatial Modulators (SM) and/or filtering apparatus. This includes, amongst others, Spatial Light Modulators (SLM) in combination with use of a Fourier Lens. Said filters may also include band pass, band stop (band reject or notch), high pass, and low pass filters, amongst others.

Part of the said data elements and/or datasets, filtered or unfiltered as by means of spectral analyzers or not, may contain SOLUTIONS or partial solutions to the situation, event or other problem. The part which contain the SOLUTIONS or partial solutions is referred to in the invention as Stimulus B.

The remainder of the said data elements and/or datasets, which may include components of Stimulus B, are referred to as Stimulus A.

Stimulus B is held temporarily in a memory bank to be stored into one or more Associative Memories as is more fully explained below.

Stimulus A is fed to one or more DROPLET GENERATORS. Said DROPLET GENERATORS may be local to the said input data elements and/or datasets, or may be remotely connected by means of a network.

Intelligent point-based objects known in the invention as DROPLETS, real or virtual, are generated as data delegates (avatars) having communication and control links with the said input data. Some or all of the DROPLETS may contain additional embedded intelligence in the form of data and methods having a corallary to class instances used in Object-Oriented Programming. Thus any DROPLET may be thought of as having its own internal computer, or some type of BLACK BOX internal processing apparatus.

The DROPLETS having been generated are collected and spatially located within a Common Dimensional Space (CDS).

The CDS, real or virtual, may be connected to the invention locally or by means of a network to any plurality of said DROPLET GENERATORS.

One or more holographic recording apparatus, placed in real or virtual proximity to the CDS, are activated. Each of said holographic recording apparatus may be connected to the CDS locally or remotely by means of a network. For practicality, each of said holographic recording apparatus may contain its own copy of the CDS.

All or part of said DROPLETS are transmitted to each of said holographic recording apparatus by said one or more DROPLET GENERATORS, locally or remotely by means of a network, and in whatever combination desired according to the mandates of the situation, event or other problem, or as to how the same is being setup for analysis by the HCS.

In the invention, each of the said holographic recording apparatus is referred to as an Electronic Diffraction Unit (EDU).

Coherent rays, real or virtual, are introduced from within or from without the CDS.

Said rays generate wavefronts that ultimately cause one or more holograms—interference patterns—to be formed. How this occurs is that part of the rays that are introduced are either reflected or transmitted passively, or emitted actively, by the one or more DROPLETS, real or virtual, which are spatially placed in proximity, locally or remotely by means of a network, to the said holographic recording media.

Said coherent rays may also be modulated with waveforms, either collected from input data elements, or collected from the intelligence of other DROPLETS which may generate them.

Said rays which are emitted, transmitted, or reflected by the DROPLETS altogether as a collective wavefront comprise the OBJECT BEAM. The OBJECT BEAM strikes the said holographic media, which are surface or volume oriented, real or virtual. Said rays are thus captured and latently integrated in the recording pixels of the recording media.

Thus, the said OBJECT BEAM is captured, and the resultant hologram or holograms can be used directly to generate one or more HOAP codes as explained below. However, preferably, the said OBJECT BEAM is first integrated in or on the holographic recoding media with a portion of the originating sources of the coherent rays, on a similar pixel by pixel basis. In other words, these source rays being integrated, strike the said holographic recording media directly, without first interacting with the passive sub-plurality of DROPLETS. Said source rays are referred to as the REFERENCE BEAM. Reiterating, there may be more than one of said sources of these rays in the invention, including, as stated, the one or more actively emitting DROPLETS.

The said OBJECT BEAM, by itself, or integrated with the one or more REFERENCE BEAMS on a holographic recording pixel by pixel basis, is said in the invention to contain the INTELLIGENCE WAVEFRONT of the situation, event or other problem.

Said captured INTELLIGENCE WAVEFRONT is also said in the invention to be an ENTANGLEMENT of the situation, event or other problem because each recording pixel contains the whole of the entire spatial configuration of droplets, and therefore each is connected or ENTANGLED, practically speaking, to every other DROPLET that contributed to the said OBJECT BEAM. As a proof, any substantial sub-plurality of the recorded holographic pixels can ultimately reconstruct the entirety of DROPLETS at surgically precise positions within the Common Dimensional Space if the original one or more REFERENCE BEAMS are re-introduced.

Alternately, the resulting hologram or holograms can also be produced by diffracting coherent rays, real or virtual, through a plurality of one or more processed holograms, real or virtual, which are in proximity to the said holographic recording media.

Thus, one or more holograms of the Intelligence Wavefront by means of a recorded interference pattern of coherent rays interacting with DROPLETS is generated by the said methods and means.

The resulting recorded hologram or holograms of said INTELLIGENCE WAVEFRONT consists of a recording surface or volume, real or virtual, containing numerous locations of alternating variations of light and dark, also known as pixels, each representing the integrated magnitude of energy caused by the interference of waves or particles of coherent electromagnetic radiation, real or virtual. The HCS has read and write access to the said hologram by any means which include optical, electronic and/or computational apparatus. Thus the said pixels may be scanned or otherwise sampled and then stored as light, dark and gray level pixels. From here they can be used as either analog weight values or analog voltage levels, or as digital ones and zeros, or high or low voltages.

In the preferred embodiment, the holographic pixels are converted from their analog gray level state to a digital state by a procedure of: (1) examining the holographic pixels stored in a computer memory; (2) converting the said pixels to integers, if they are floating point values; and (3) using the binary bits that represent the magnitudes of said integers. In an alternative embodiment, the holographic pixels are converted from their analog gray level state to a digital state using an analog-to-digital converter (ADC), which for all practical purposes is a scanner or other sensor. After scanning, the holographic pixels may be converted by means of the above procedure.

These said pixels now expanded into binary digits (bits) are collectively used as machine instruction codes to generate a solution in the HCS.

Said machine instruction codes are referred to in the invention as HOAP (Hologram-Of-A-Problem) codes. They are stored temporarily in one or more INSTRUCTION REGISTERS which will be used by one or more associative memories to decode them, as is more fully explained herein.

Connected to the HOAP (Hologram-Of-A-Problem) Codes, that is, to the instruction register or registers which temporarily hold them, is one or more ASSOCIATIVE MEMORIES, also sometimes known in electronics and computing as a perceptron or neural network (23,25,27,28). By conventions used within the art and science pertaining to associative memories, there are many ways to construct an associative memory, some analog, some digital, and all of them are within the scope of the invention. In whatever format used, the associative memory is comprised of a collective of individual neurocells or neurons. The neurons may be real or virtual. In the preferred embodiment these neurons are electronic memory units called RAM units, i.e., Random Access Memory circuits. The address lines of each RAM unit form an analog to a biological neuron and are referred to as the dendrites, and the output lines of each RAM unit, by the same analog, form what is referred to as an axon.

The said Instruction Register and the said Associative Memory Unit (AMU) altogether combine to make what may be referred to as an Instruction Decoder. Hereafter, they are referred to collectively as an Entanglement Translator (ET).

The Entanglement Translator (ET) is described as follows:

The dendrites of each neuron of each associative memory are connected to the hologram by reason of connecting them to the Instruction Register or memory arrays where the binary machine instruction HOAP (Hologram-Of-A-Problem) Codes are temporarily stored for translation by said one or more associative memories. In the preferred embodiment, each neuron's dendrites are connected in a randomly distributed fashion to the pixels of the hologram, more precisely to the bits of the HOAP (Hologram-Of-A-Problem) Codes contained in the Instruction Register or other memory. This connection may be a virtual one, as by means of an algorithm working with arrays of memory variables within a standard computer or microprocessor-based architecture. But in the case of a real connection it may be by means of wires, wireless, optical, optical fibers or any other form of communication connected to physical RAMs or similar hardware. The RAMs or similar hardware used for the memory cells may be digital or analog devices.

The storage cells, or internal registers, within each neuron of the plurality of neurons that comprise the associative memory are opened to receive data from the data bus and the memory location opened in each is formed by means of the dendrites, i.e., address lines, connected to the holographic pixels, or HOAP codes.

The data presented on the data bus are virtual weights in the form of either analog or digital signals. The data bus can be large or small depending upon how the associative memory is configured, such as by parallel data signals, one to each neuron, or by sequentially placing the signals one at a time on the bus and clock-writing the data into each accordingly in sequence. Said opening of memory locations occurs, in the case of RAMS, by write enable (WE) and/or clock control lines.

Said memory locations within each of the memory cells are now loaded with harmonic components that were earlier processed by the forward spectrum analyzer and temporarily stored. In the preferred embodiment each memory location holds a code consisting of at least a sine amplitude, one cosine amplitude, and one frequency as related to a single spectral harmonic component from the collective of components comprising the said earlier processed frequency domain data derived from input waveforms by means of the forward spectrum analyzer.

Other embodiments or permutations on this scheme of storing data are envisioned within the scope of this invention. One of these variations, amongst others, is that the system knows what frequencies are stored in which neurons beforehand by means of a lookup table or by means of a consecutive or other mathematical sequence so that the frequency itself does not need to be stored in the neuron. Another of these variations, amongst others, is that the spectral components are spread randomly amongst the neurons, but such where the sine and cosine amplitudes are kept in relation to each other per neuron. Another of these variations, amongst others, is that the associative memory consists of a plurality of associative memories constructed in similar fashion to that mentioned but where each exists in parallel whereby one associative memory holds the sine values, another holds the cosine values, and another holds the frequency values. Wherefore, the associative memory thus described, whether an individual one connected to the hologram or several in parallel connected to the hologram, becomes the storage apparatus of waveforms consisting of streams of information which have been converted by a forward spectrum analyzer into frequency domain components which are therefore stored into the associative memory having been associated with a holographic recording of one or more objects.

Though the preferred embodiment of this invention uses forward and reverse spectrum analyzers to wholistically compress and decompress data into the associative memory, alternatively the associative memory may be directly loaded with values NOT having passed through said analyzers. This may be better served by values such as recognition tags, heuristics, and other binary codes and data, including, amongst others, quantitative information that may be directly counted in the form of firing thresholds.

Moreover, the apparatus has the additional capability of integrating and averaging the information that is collected and stored in the associative memory over a certain given time with like data which have been collected and stored at a current time. The purpose is that these integrated harmonic components, amplitudes and frequencies—or other codes and data—stored in the associative memory will become averaged over time, so that the system has the potential to develop a useful bias toward the more dominant patterns which it becomes familiar with. This also has the desirable effect of compressing information which is stored in the HCS and gives the HCS the properties of an efficient learning computer.

The HCS is capable of RECALLING the information which has been stored into its associative memory. As a reverse process to the above stated TRAINING method, this is described as follows:

By presenting the Entanglement Translator with a hologram generated according to the same method as that which would occur during training, but at another time, according to a future situation, event or other problem, a SOLUTION or partial solution may be presented. The hologram is converted to a HOAP code, and fed through the associative memory thereby invoking an association with the earlier-stored content in the form of frequency domain data or other stored codes or data. In this case, memory locations in the memory cells are opened, in the case of RAMS, by read enable (RE) and/or clock control lines.

Said codes and data are collected and may be presented directly as said solution or partial solution, or they may be further processed by the system before such presentation. If the solution comprises frequency domain content then this content is first fed back through either the original spectrum analyzer now set to run in reverse mode, or it is fed through a dedicated reverse spectrum analyzer. The spectrum analyzer then reconstructs the recalled frequency domain data back into a time domain envelope; the resulting waveform, may then be presented as a solution or partial solution to be used directly, or be further filtered or processed by the system for whatever purpose.

One final point of description is that the invention includes an all-important dedicated HOLOBUS, described as follows:

Although the HCS functions very well for solving a certain many problems without the HOLOBUS, said HOLOBUS dramatically increases the problem solving quality of the system than if it were used without it. For certain deeply multifaceted problems, the HOLOBUS is a necessary requirement. It's main purpose is to help remove, in a speedy manner, the COLLECTIVE DC COMPONENT of one or more large interference patterns generated collectively by a plurality of EDU units, as is more fully explained herein.

The DC Component is known to those skilled in the art and science of holography for causing reconstruction issues including unwanted speckle, or artifacts. When likened to electricity, It represents a shifted ground which undesirably offsets the base line of alternating amplitudes—likened to alternating current riding on DC—captured by the interference pattern, and the goal of holography is to remove it, whenever possible.

In the invention proper, said one or more EDU each generate subpluralities of holographic recording pixels which may, in certain configurations, be combined or compared together as one or a few large holograms that may be stored either as one or a few holographic interference patterns to be retrieved later for some use, or to be used as one or a few large HOAP codes, leading to one or a few common solutions. This is compared to other configurations where smaller holograms but of a higher plurality are generated, for storage as interference patterns to be retrieved later for some use, or to be used as smaller HOAP codes but of a higher plurality. In the latter configuration each EDU or a subplurality of them produces its own independent solution.

In the first stated configuration, above, where the HCS produces a collective of holographic pixels leading to one or a few collective solutions, it is desirable that each EDU store and retrieve, in parallel with other EDU, its workload of solution-bound data from its own local associative memory. In such a case, in order to ensure that each EDU is storing and/or retrieving data with regards to the correct memory cell locations, each EDU must locally remove the COLLECTIVE DC COMPONENT of the one or more collective holograms—NOT its LOCAL DC COMPONENT! In order to do this, each EDU needs some means to communicate with other EDU to compare certain items.

At a minimum, each EDU must somehow compute and SEND its value of electrical equivalent energy tallied from its local portion holographic pixels, to the other EDU. Correspondingly, each EDU must receive the electrical equivalent energy values from each of the other EDU.

Therefore, the HOLOBUS is defined, in part, as a dedicated means of communication between the plurality of EDU for sharing local holographic electrical energy equivalents. This affords each EDU to simply concentrate on finding its own local electrical energy equivalent of the one or few common holograms that it generates, which information is shared by means of said HOLOBUS with the rest of the plurality of EDU. What is seen here is that since EDU each locally contain independent processing apparatus that is used to generate holographic pixels in parallel, the HOLOBUS ultimately allows the removal of the DC Component in parallel, thus saving the system greatly on its throughput time.

Once the collective of these local average electrical equivalent energies are sent and received by each desired subplurality of EDU, each EDU can adjust the electrical equivalent energy of its local holographic pixels so that the COLLECTIVE DC COMPONENT is removed from said local holographic pixels. By removing the COLLECTIVE DC Component, each EDU inevitably contributes more robust holographic pixels to the said one or few large collective holograms, thus leading to higher quality reconstructions. Moreover, each EDU, having holographic pixels with the right amount of holographic electrical equivalent energy, will produce its portion of the HOAP code correctly so that the correct memory cells in the associative memory will be located.

An additional use of the HOLOBUS is that the holographic pixels themselves may be transmitted to one or more system-common Instruction Registers where their binary converted bits are collected for use as said one or more very large HOAP codes.

A further reason for the HOLOBUS is that it serves as an additional feedback line so that active DROPLETS which emit REFERENCE BEAMS can adjust the amplitude of their coherent rays by a determined amount, a magic number as it were, which also leads to more robust holograms, and therefore, more robust HOAP Codes.

In conclusion, to the inventors' knowledge, there is no precedent in the prior art that is capable of analyzing or solving problems of wide latitude of complexity using the least understood, least recognized, enfoldment properties of the science of holography. In the case of the Holographic Computer System, this enfoldment, or quantum-like entanglement, is made to serve as a practical and effective general purpose problem solving tool.

Although the foregoing description contains many specifics, these are not to be construed as limiting the scope of the present invention, but merely as providing certain exemplary embodiments. Similarly, other embodiments of the invention may be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims are encompassed by the present invention.

The invention claimed is:

1. In a holographic computing system, a computer program product comprising one or more non-transitory computer readable storage media for storing computer executable instructions for categorizing problem solving solutions by using holographic object data as an addressing thereof, wherein the computer executable instructions are stored in such a way that when executed by a computing device cause it to:
   receive data that represents one or more real-world objects;
   divide the data into one or more sections;
   generate one or more holographic waveforms for each of the one or more sections, wherein each holographic waveform represents a holograph of spectral components of the divided one or more sections of data; and
   record the one or more holographic waveforms onto the non-transitory computer readable storage medium in such a way that allows them to each act as addressing for an artificial neural network, wherein the addressing subsequently provide possible solutions to an input of a problem.

2. The computer program product of claim 1, wherein the recording of the one or more holographic waveforms onto a computer readable storage medium is performed at least in part by a server separate from the portion of the holographic computer system that receives data that represents one or more real-world objects in holographic form.

3. The computer program product of claim 1, wherein the received data includes data from one or more keyboards, scanners, communications networks, sensory devices, computer systems, cloud servers, or mobile devices and wherein the one or more real-world objects include one or more of: a physical object or sound; a virtual object or sound; or recorded image, text or sound data.

4. The computer program product of claim 1, wherein the spectral components include one or more of: varying shades of gray scale pixel intensity; varying pixel color, intensity, or both; or varying frequencies, amplitude, or both, of a pure sine wave.

5. The computer program product of claim 1, wherein the computer executable instructions, which when executed cause the computer device to record the one or more holographic waveforms, also cause it to:
   transform the one or more holographic waveforms into analog or digital addresses;
   store the analog or digital addresses; and
   link data associated with the one or more real-world objects to the stored analog or digital addresses, which provide added data for subsequent solutions to an input of a problem.

6. The computer program product of claim 5, wherein storing of the analog or digital addresses includes storing them in a lookup table of a database.

7. The computer program product of claim 5, wherein the linked data associated with the one or more real-world objects includes at least a portion of the holographic waveform used for addressing.

8. In a holographic computing system, a method of categorizing problem solving solutions by using holographic object data as an addressing thereof, the method comprising:
   receiving data that represents one or more real-world objects;
   dividing the data into one or more sections;
   generating one or more holographic waveforms for each of the one or more sections, wherein each holographic waveform represents a holograph of spectral components of the divided one or more sections of data; and
   recording the one or more holographic waveforms onto a non-transitory computer readable storage medium in such a way that allows them to each act as addressing for an artificial neural network, wherein the addressing subsequently provide possible solutions to an input of a problem.

9. The method of claim 8, wherein the recording of the one or more holographic waveforms onto a computer readable storage medium is performed at least in part by a server separate from the portion of the holographic computer system that receives data that represents one or more real-world objects in holographic form.

10. The method of claim 8, wherein the received data includes data from one or more keyboards, scanners, communications networks, sensory devices, computer systems, cloud servers, or mobile devices and wherein the one or more real-world objects include one or more of: a physical object or sound; a virtual object or sound; or recorded image, text or sound data.

11. The method of claim 8, wherein the spectral components include one or more of: varying shades of gray scale pixel intensity; varying pixel color, intensity, or both; or varying frequencies, amplitude, or both, of a pure sine wave.

12. The method of claim 8, wherein the step of recording further comprises:
transforming the one or more holographic waveforms into analog or digital addresses;
storing the analog or digital addresses; and
linking data associated with the one or more real-world objects to the stored analog or digital addresses, which provide added data for subsequent solutions to an input of a problem.

13. The method of claim 12, wherein storing of the analog or digital addresses includes storing them in a lookup table of a database.

14. The method of claim 12, wherein the linked data associated with the one or more real-world objects includes at least a portion of the holographic waveform used for addressing.

15. In a holographic computer system, a method of problem solving using data addressed by holographic waveforms of real-world object data, the method comprising:
accessing an address of a non-transitory computer readable storage;
converting the address into analog form;
using the analog form of the address for producing one or more harmonics of a holographic waveform, which waveform represents a holograph of spectral components of at least one object dataset recorded from the real-world object; and
analyzing the one or more harmonics of the holographic waveform to reconstruct at least a portion of the at least one object dataset for the real-world object, which is configured for use in problem solving for an artificial neural network.

16. The method of claim 15, further comprising recording the one or more harmonics of a holographic waveform onto a computer readable storage medium using a server separate from the portion of the holographic computer system that receives data that represents one or more real-world objects in holographic form.

17. The method of claim 15, wherein the one or more real-world objects include one or more of: a physical object or sound; a virtual object or sound; or recorded image, text or sound data.

18. The method of claim 15, wherein the spectral components include one or more of: varying shades of gray scale pixel intensity; varying pixel color, intensity, or both; or varying frequencies, amplitude, or both, of a pure sine wave.

19. The method of claim 15, wherein data linked to the addresses is also used in producing, analyzing, or both, of the one or more harmonics of the holographic waveform and provides added data for subsequent solutions to an input of a problem.

20. The method of claim 19, wherein the address is stored in a lookup table of a database.

21. The method of claim 19, wherein the linked data is associated with the one or more real-world objects and includes at least a portion of the holographic waveform used for addressing.

22. An electronic method for rapidly identifying a hologram, the method comprising:
on the front (dendritic) end of the method, associating a complex waveform signal heuristic identifier with an interference pattern of the hologram;
deconstructing the fundamental and harmonic components of the complex waveform signal using a spectrum analyzer or Fourier analysis;
storing the deconstructed components in a non-transitory computer readable storage a back (axonal) end network or data memory address;
keying the address for storage based on the interference pattern;
associatively recalling the heuristic identifier from the network or memory using the hologram interference pattern key; and, reconstructing the heuristic identifier back into the complex waveform signal.

23. The method of claim 22, wherein the heuristic identifier is selected from the group consisting of: instruction codes, semaphores or flags, images, drawings, photos, graphs, audio-visual data, and a hologram.

24. The method of claim 1, wherein data received from the one or more real world objects comprises a photograph of the one or more objects.

25. The method of claim 8, wherein the input problem concerns identification of the real-world object.

26. The method of claim 8, wherein the input problem is presented in the form of an interference pattern.

27. The method of claim 8, wherein the problem solved is identification of an object that has similarities to, but is not identical to, the real-world object.

28. The method of claim 15, wherein the system comprises: a source of coherent rays to interrogate the real-world object, the hologram of the one or more sections generated using the coherent rays, and the computer readable storage medium.

29. The method of claim 28, wherein the hologram of the one or more sections comprises an analog hologram of the real-world object.

* * * * *